United States Patent
Watakabe

(10) Patent No.: US 7,429,428 B2
(45) Date of Patent: *Sep. 30, 2008

(54) POLYMER ELECTROLYTE MATERIAL, PRODUCTION METHOD THEREOF AND MEMBRANE ELECTRODE ASSEMBLY FOR POLYMER ELECTROLYTE FUEL CELL

(75) Inventor: Atsushi Watakabe, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/166,371

(22) Filed: Jun. 27, 2005

(65) Prior Publication Data

US 2005/0266291 A1    Dec. 1, 2005

Related U.S. Application Data

(63) Continuation of application No. PCT/JP2004/006127, filed on Apr. 28, 2004.

(30) Foreign Application Priority Data

Apr. 28, 2003 (JP) .............................. 2003-123383

(51) Int. Cl.
*H01M 8/10* (2006.01)
(52) U.S. Cl. .................. 429/33; 429/314; 429/317; 521/25
(58) Field of Classification Search ................ 429/33, 429/314, 317; 521/25
See application file for complete search history.

(56) References Cited

U.S. PATENT DOCUMENTS

| 3,282,875 A | * | 11/1966 | Connolly et al. ............ 524/795 |
| 4,973,714 A | | 11/1990 | Krespan ..................... 549/451 |
| 5,586,626 A | * | 12/1996 | Dolbear et al. .......... 188/250 B |
| 6,586,626 B2 | * | 7/2003 | Okazoe et al. .............. 562/863 |

(Continued)

FOREIGN PATENT DOCUMENTS

EP        1126537        8/2001

(Continued)

OTHER PUBLICATIONS

U.S. Appl. No. 11/166,371, filed Jun. 27, 2005, Watakabe, et al.

(Continued)

*Primary Examiner*—Peter D. Mulcahy
*Assistant Examiner*—Henry S. Hu
(74) *Attorney, Agent, or Firm*—Oblon, Spivak, McClelland, Maier & Neustadt, P.C.

(57) ABSTRACT

The present invention provides a polymer electrolyte material comprising a polymer having a repeating unit based on an alicyclic fluoromonomer having a carbon-carbon double bond with radical polymerization reactivity, wherein either of carbon atoms at both ends of the double bond constitutes a ring structure; the repeating unit contains a strongly acidic group such as a sulfonic acid group; the polymer is preferably perfluorinated. This electrolyte material has a high softening temperature and a polymer electrolyte fuel cell using this electrolyte material can be operated at higher temperatures than before. Furthermore, when this electrolyte material is used for a catalyst layer of a cathode in a polymer electrolyte fuel cell, an output voltage of the cell can be increased.

34 Claims, 1 Drawing Sheet

U.S. PATENT DOCUMENTS

| | | | |
|---|---|---|---|
| 6,610,789 B2 * | 8/2003 | Watakabe et al. | 525/276 |
| 7,220,508 B2 * | 5/2007 | Watakabe et al. | 429/33 |
| 2002/0142207 A1 * | 10/2002 | Watakabe et al. | 429/33 |
| 2003/0023016 A1 | 1/2003 | Michot et al. | 526/247 |
| 2003/0198854 A1 | 10/2003 | Watakabe et al. | 429/33 |
| 2004/0230018 A1 * | 11/2004 | Okazoe et al. | 526/242 |
| 2005/0037265 A1 | 2/2005 | Watakabe | 429/309 |
| 2005/0266291 A1 * | 12/2005 | Watakabe | 429/33 |

FOREIGN PATENT DOCUMENTS

| | | | |
|---|---|---|---|
| EP | 1220344 A2 * | 12/2001 | |
| EP | 1220344 A2 * | 7/2002 | |
| JP | 5-213929 A * | 8/1993 | |
| JP | 05213929 * | 8/1993 | |
| JP | 2675548 | 7/1997 | |
| JP | 2001-522376 | 11/2001 | |
| JP | 2002-146186 | 5/2002 | |
| JP | 2002-260705 | 9/2002 | |
| WO | WO86/06879 | 11/1986 | |
| WO | WO-00/56694 * | 9/2000 | |
| WO | WO 03/037885 | 5/2003 | |

OTHER PUBLICATIONS

U.S. Appl. No. 11/311,560, filed Dec. 20, 2005, Watakabe, et al.
U.S. Appl. No. 11/244,002, filed Oct. 6, 2005, Watakabe, et al.
Chen et al, J. Fluorine Chem., 1990, vol. 46, pp. 39-56.
U.S. Appl. No. 11/741,008, filed Apr. 27, 2007, Hommura, et al.

* cited by examiner

POLYMER ELECTROLYTE MATERIAL, PRODUCTION METHOD THEREOF AND MEMBRANE ELECTRODE ASSEMBLY FOR POLYMER ELECTROLYTE FUEL CELL

TECHNICAL FIELD

The present invention relates to a polymer electrolyte material comprising a polymer having an ionic group which is useful, for example, as an electrolyte membrane for brine electrolysis or for a polymer electrolyte fuel cell, as an electrolyte for a catalyst layer of a fuel cell, as an electrolyte for a lithium battery, and so on, and a method for its production.

BACKGROUND ART

Heretofore, it has been common practice to employ, for a membrane for brine electrolysis or for a membrane or a catalyst layer of a polymer electrolyte fuel cell, a polymer obtained by hydrolyzing a copolymer of a fluoromonomer represented by $CF_2=CF-(OCF_2CFY)_m-O_p-(CF_2)_n-SO_2F$ where Y is a fluorine atom or a trifluoromethyl group, n is an integer of from 1 to 12, m is an integer of from 0 to 3, p is 0 or 1 and m+p>0, with tetrafluoroethylene, or a polymer having a sulfonic acid group (the polymer having a sulfonic acid group will be referred to hereinafter as a "sulfonic acid polymer") obtained by further converting the hydrolyzed copolymer to an acid form.

Since the above-mentioned sulfonic acid polymer has a softening temperature of near 80° C., an operation temperature of the fuel cell using the polymer is normally at most 80° C. However, in a case where a fuel gas for a fuel cell is hydrogen obtained by reforming an organic compound composed of carbon and hydrogen atoms or composed of carbon, hydrogen and oxygen atoms, such as methanol, natural gas or gasoline, carbon monoxide, if contained even in a trace amount, will poison an electrode catalyst, and it will be likely to result in a drop of output power of the fuel cell. There are, therefore, strong demands for increase of the operation temperature, in order to prevent the drop of the power. Furthermore, the increase of the operation temperature is also demanded in order to miniaturize a cooling apparatus for a fuel cell. However, the above-mentioned conventional polymer has the softening temperature too low to meet these demands.

Japanese Patent 2,675,548 offered a proposal on use of a sulfonic acid polymer having a short side chain and a high softening temperature as an electrolyte for a fuel cell. However, since such a sulfonic acid polymer is produced with difficulties and at high cost, it has not been produced in practice.

It is conceivable that if a polymer has a ring structure, a softening temperature will generally increase and it becomes possible to generate power at a temperature higher than the present level. However, the conventional technology for introducing an ionic group such as a sulfonic acid group into a polymer was copolymerization with a monomer having this ionic group and a polymerization moiety of vinyl ether, but it had a problem that the softening temperature of the polymer was not sufficiently increased.

On the other hand, there has been no conventional example of synthesis of a monomer having an ionic group, such as a sulfonic acid group, or its precursor group, a ring structure and a polymerization moiety with polymerization reactivity higher than that of a perfluorovinyl ether. JP-A-2001-522376 exemplifies monomers of (A) to (E) below, which are, however, hard to synthesize in fact, and describes neither a synthesis method nor a synthesis example. Furthermore, there is no description on a polymer having a repeating unit based on the monomer. In the formulae below, M' is hydrogen, an alkali metal, an alkaline-earth metal, or the like, X is a fluorine atom, a chlorine atom or a trifluoromethyl group, n is 0 to 10, and Q is a hydrogen atom, a fluorine atom, a cyano group, an alkyl group, an $SO_2R$ (R is an alkyl group or the like), or the like.

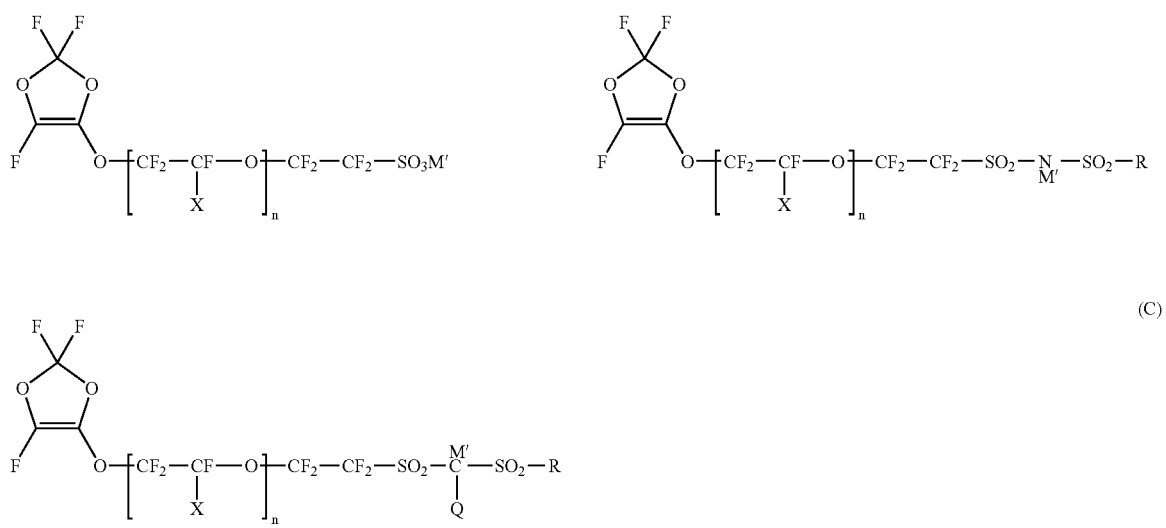

-continued

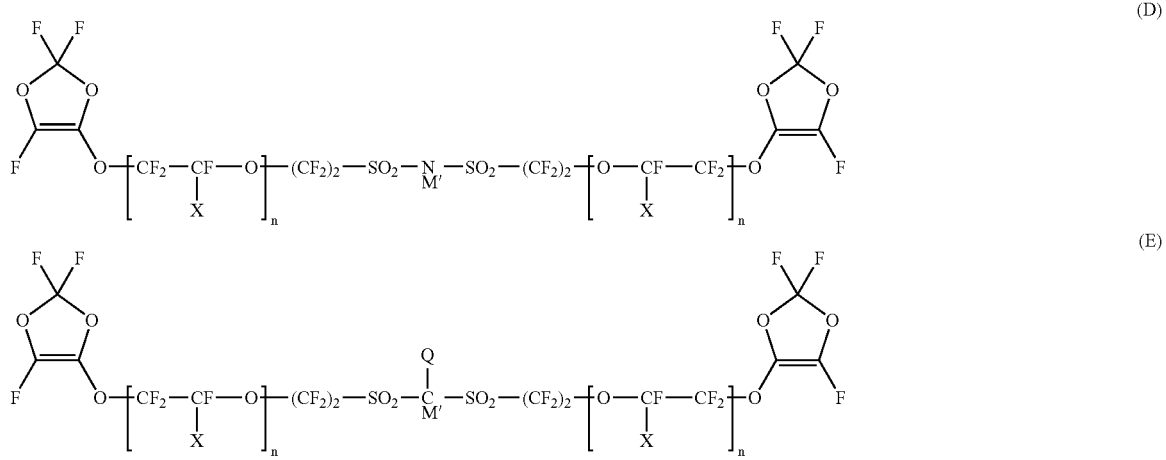

U.S. Pat. No. 4,973,714 discloses a monomer represented by formula (F) below where X represents one of various functional groups such as F, Cl, —OC$_6$F$_5$, —CN, —COF, —COOR(R is —CH$_3$, —C$_2$H$_5$ or —CH$_2$CF$_3$), —SO$_2$F and —SO$_2$Cl. However, it is difficult to synthesize a compound wherein X is —SO$_2$F or —SO$_2$Cl (R$^{f1}$ is a fluorine atom or a perfluoroalkyl group and R$^{f2}$ is a perfluoroalkenyl group which may contain an oxygen atom of an ether bond type), and the U.S. patent describes no synthesis example thereof.

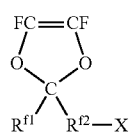

(F)

JP-A-2002-260705 describes that a polymer electrolyte having a ring structure has a high softening temperature as a polymer and that increase of output can be achieved by applying it to an electrolyte contained in a cathode of a fuel cell. In this document, a perfluorovinyl ether monomer having a sulfonic acid group or a functional group convertible into a sulfonic acid group (which will be referred to hereinafter as a "sulfonic acid type functional group" in the present specification), but having no ring structure is copolymerized with a monomer having no sulfonic acid type functional group and having a ring structure or cyclopolymerizability, thereby obtaining a polymer having a ring structure and a sulfonic acid group. However, such a polymer fails to sufficiently increase a ratio of the ring structure to the whole polymer. In addition, it was difficult to produce a polymer with a high molecular weight if the above-mentioned perfluorovinyl ether monomer was used.

DISCLOSURE OF THE INVENTION

An object of the present invention is to provide a polymer electrolyte material which has a softening temperature higher than before and which allows operation of a fuel cell at a temperature higher than before in use as an electrolyte for a polymer electrolyte fuel cell. Another object of the present invention is to provide a polymer electrolyte material that can contribute not only to operation at a high temperature but also to increase of output of a fuel cell.

The present invention provides a polymer electrolyte material comprising a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by —(SO$_2$X(SO$_2$R$^f$)$_a$)$^-$M$^+$ where M$^+$ is H$^+$, a monovalent metal cation or an ammonium ion at least one hydrogen atom of which may be substituted by a hydrocarbon group, R$^f$ is a linear or branched perfluoroalkyl group which may contain an oxygen atom of an ether bond type, X is an oxygen atom, a nitrogen atom or a carbon atom, a=0 in the case of X being an oxygen atom, a=1 in the case of X being a nitrogen atom, and a=2 in the case of X being a carbon atom.

The above-mentioned ionic group (which will be referred to hereinafter as a "present ionic group") is, for example, a strong acid group such as sulfonic acid, or a salt thereof, and is suitable for an ionic group of an electrolyte material. The repeating unit based on the alicyclic fluoromonomer may contain at least two present ionic groups. Since the polymer forming the polymer electrolyte material of the present invention has a high softening temperature by virtue of the ring structure, it can be used at a higher temperature than the electrolyte materials made of the conventional fluoropolymers.

Furthermore, the present invention provides a polymer electrolyte membrane which is a membrane comprising the above-mentioned electrolyte material. Such a membrane is suitably applicable as an electrolyte membrane of a polymer electrolyte fuel cell, for example.

Furthermore, the present invention provides a liquid composition having the above-mentioned electrolyte material dissolved or dispersed in a solvent having a hydroxyl group and/or water. An electrolyte membrane can be produced by using such a liquid composition. It is also useful for producing a catalyst layer of a polymer electrolyte fuel cell, for example.

Still furthermore, the present invention provides a method for producing a polymer electrolyte material comprising effecting radical polymerization of an alicyclic fluoromonomer having a fluorosulfonyl group and a carbon-carbon double bond with radical polymerization reactivity, either of carbon atoms at both ends of the double bond constituting a ring structure, in the presence of a radical initiating source, and subsequently converting the fluorosulfonyl group into a sulfonic acid group.

Yet furthermore, the present invention provides a membrane electrode assembly for a polymer electrolyte fuel cell comprising a cathode and an anode each having a catalyst layer containing a catalyst and a polymer electrolyte, and a polymer electrolyte membrane disposed between the cathode and the anode, wherein the polymer electrolyte membrane is made of the above-mentioned polymer electrolyte material.

Moreover, the present invention provides a membrane electrode assembly for a polymer electrolyte fuel cell comprising a cathode and an anode each having a catalyst layer containing a catalyst and a polymer electrolyte, and a polymer electrolyte membrane disposed between the cathode and the anode, wherein at least one of the catalyst layer of the cathode and the anode contains the above-mentioned polymer electrolyte material.

BEST MODE FOR CARRYING OUT THE INVENTION

Figure 1:
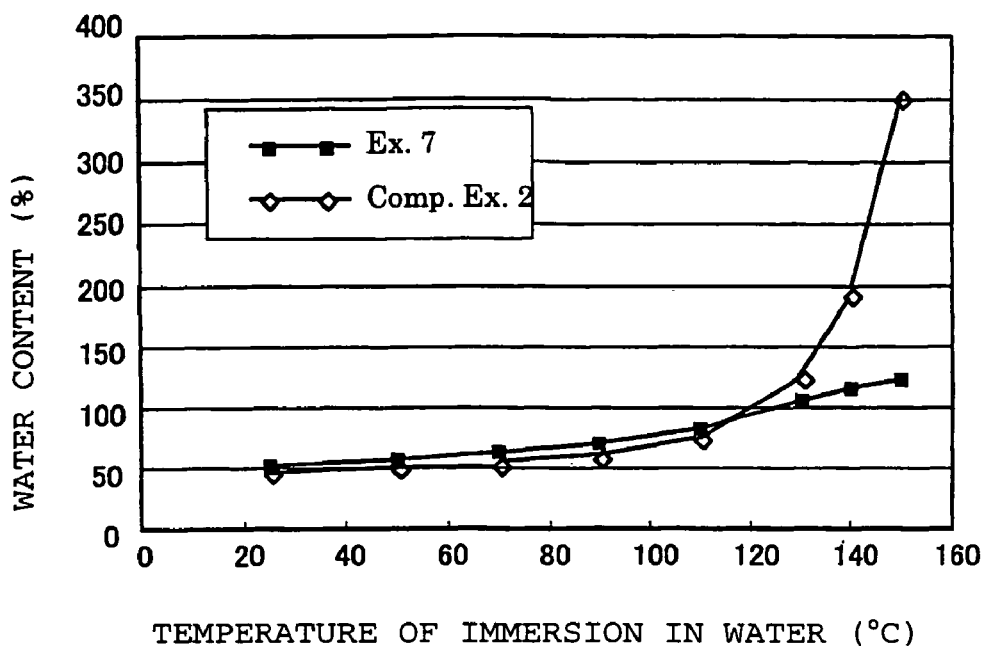
FIG. 1 is a drawing showing relations between water contents and temperatures of immersion in ion-exchange water, of films obtained in Example 7 and Comparative Example 2.

In the present specification, a compound represented by formula (X) will be referred to as a compound (X). Likewise, a repeating unit represented by formula (Y) will be referred to as a repeating unit (Y).

A production method according to the present invention employs a fluoromonomer having a ring structure in a polymerization moiety, in order to introduce the ring structure into the main chain of a polymer constituting a polymer electrolyte material, and having an ionic group or a group convertible into this ionic group; preferably, a perfluorinated monomer.

The present inventor considered that it was preferable to introduce a ring structure in order to obtain a polymer electrolyte membrane having a high softening temperature or a polymer electrolyte having a high oxygen solubility or oxygen permeability and that it was preferable to adopt polymerization of a monomer having a structure of formula (F) or formula (G) below. However, as described in the section of Background Art, it is difficult to synthesize the compound of the formula (F). From the viewpoint of synthesis, it is preferable to employ the monomer having the structure of the formula (G) below.

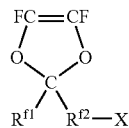

(F)

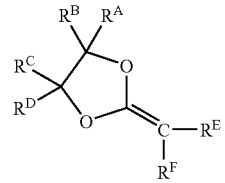

(G)

In the formula (G), $R^A$ to $R^D$ each independently are selected from the group consisting of a monovalent perfluoro organic group which may contain at least one of the present ionic group or its precursor group, and an oxygen atom of an ether bond type, and an fluorine atom, or may be a bivalent perfluoro organic group in which two of $R^A$ to $R^D$ are bonded to each other and may contain at least one of the present ionic group or its precursor group, and an oxygen atom of an ether bond type. At least one of $R^A$ to $R^D$ contains the present ionic group or its precursor group. $R^E$ and $R^F$ each independently are a monovalent perfluoro organic group which may contain an oxygen atom of an ether bond type, or a fluorine atom.

The precursor group of the present ionic group herein is a group convertible into the present ionic group by a known treatment such as hydrolysis or a treatment for conversion into an acid form, e.g., —SO$_2$F or the like. After polymerization, the precursor group is converted into the present ionic group to obtain the polymer electrolyte material. Furthermore, specifically, the above-mentioned perfluoro organic group is preferably a perfluorocarbon group which may contain an oxygen atom of an ether bond type. Among compounds represented by the formula (G), it is particularly preferable to adopt a compound represented by formula (3).

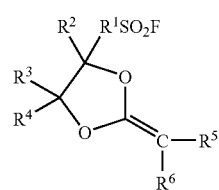

(3)

In the formula (3), $R^1$ is a bivalent perfluoro organic group which may contain an etheric oxygen atom, and $R^2$ to $R^6$ each independently are a fluorine atom or a monovalent perfluoro organic group which may contain an oxygen atom of an ether bond type. The organic group here means a group containing at least one carbon atom, and the monovalent perfluoro organic group is particularly preferably a linear or branched perfluoroalkyl group which may contain an etheric oxygen atom inside or at one end of the alkyl chain.

At least one of $R^5$ and $R^6$ is preferably a fluorine atom in the compound (3) in order to exhibit high polymerizability. In a case wherein either of $R^5$ and $R^6$ is a fluorine atom, the other is more preferably a fluorine atom or a perfluoroalkoxy group, and it is further preferable to use a compound having a structure of formula (3') below where $R^5$ and $R^6$ both are a fluorine atom. $R^{12}$ to $R^{14}$ in the compound (3') each independently represent a fluorine atom or a perfluoroalkyl group which may have an etheric oxygen atom inside or at one end of the alkyl chain; and $R^1$ represents a bivalent perfluoro organic group which may have an etheric oxygen atom, wherein an atom bonded to the ring may be an oxygen atom.

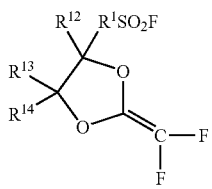

(3')

A compound (4) is particularly preferred among the compounds (3') because it has high polymerization reactivity and is easy to synthesize.

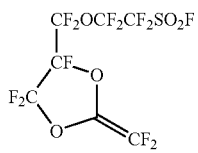

(4)

The compound (4) is synthesized by one of several methods described in International Application Number PCT/JP02/11310. For example, it can be synthesized by a synthesis scheme below. In the synthesis scheme, $R^{f'}$ represents a linear or branched perfluoroalkyl group which may contain an oxygen atom of an ether bond type.

substituent which is perfluorinated is introduced into the compound (4).

The compound (3) is a compound having all of a highly polymerizable double bond, a ring structure and a fluorosulfonyl group (—$SO_2F$ group). A polymer obtained by hydrolyzing a polymer resulting from polymerization of this compound can be effectively used as an electrolyte material for brine electrolysis, fuel cells, lithium batteries and so on.

For example, a fluorosulfonyl group-containing polymer obtained by homopolymerization of the compound (3) can have a high molecular weight, and a sulfonic acid polymer obtained by hydrolysis of the fluorosulfonyl group in the polymer has a high ion-exchange capacity. In addition, a fluorosulfonyl group-containing polymer obtained by copolymerizing the compound (3) with another polymerizable monomer which is copolymerizable with the compound (3) (which will be referred to hereinafter as the "comonomer") can be provided with a new additional property depending on selection of the comonomer. The comonomer may be one kind of comonomer, or at least two kinds of comonomers.

A nonionic monomer is normally selected as the comonomer. The term "nonionic" means that the monomer has neither an ionic group nor a precursor group thereof. Examples of the above-mentioned comonomer include tetrafluoroethylene, chlorotrifluoroethylene, trifluoroethylene, vinylidene fluoride, vinyl fluoride, ethylene, perfluoro(3-butenyl vinyl ether), perfluoro(allyl vinyl ether), perfluoro(2,2-dimethyl-1,3-dioxole), perfluoro(1,3-dioxole), perfluoro(2-methylene-

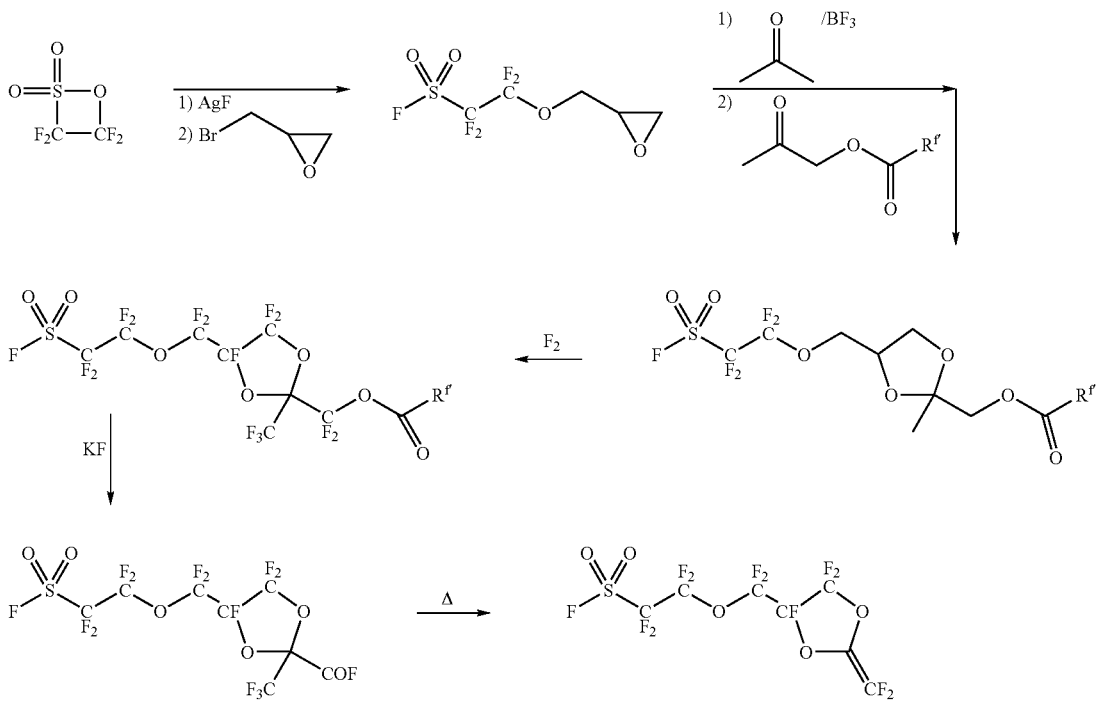

Epibromohydrin and a perfluoroalkyl ester of hydroxyacetone in the above synthesis scheme can be replaced by epibromohydrin with a substituent and by a perfluoroalkyl ester of hydroxyacetone with a substituent, respectively. In this case, it is possible to synthesize such a compound that the 4-methyl-1,3-dioxolane), perfluoro(3,5-dioxa-1,6-heptadiene), perfluoro(4-methoxy-1,3-dioxole), and so on. In addition, it is also possible to suitably use monomers below wherein p is an integer of from 2 to 6. Among them, tetrafluoroethylene is preferred because a copolymer thereof is chemically stable, is excellent in heat resistance, and has high mechanical strength and a softening temperature higher than that of the conventional sulfonic acid polymer.

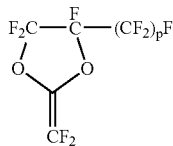 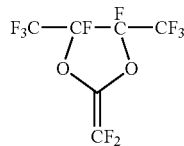

In addition to the comonomers as exemplified above, further copolymerizable comonomers to be used may be propene, perfluoro-α-olefins such as hexafluoropropene, (perfluoroalkyl) ethylenes such as (perfluorobutyl) ethylene, (perfluoroalkyl) propenes such as 3-perfluorooctyl-1-propene, and perfluorovinyl ethers such as perfluoro(alkyl vinyl ether) and perfluoro(alkyl vinyl ether containing an etheric oxygen atom).

A compound represented by $CF_2=CF-(OCF_2CFZ)_t-O-R^f$ is preferable as the comonomer of the perfluorovinyl ethers. Here, t is an integer of from 0 to 3, Z is a fluorine atom or a trifluoromethyl group, and $R^f$ is a $C_1$-12 perfluoroalkyl group which may be of a linear structure or of a branched structure. Among them, compounds (5) to (7) below are preferable. In the formulae below, v is an integer of from 1 to 9, w is an integer of from 1 to 9, and x is 2 or 3.

$$CF_2=CFO(CF_2)_vCF_3 \qquad (5)$$

$$CF_2=CFOCF_2CF(CF_3)O(CF_2)_wCF_3 \qquad (6)$$

$$CF_2=CF(OCF_2CF(CF_3))_xO(CF_2)_2CF_3 \qquad (7)$$

In order to obtain a polymer electrolyte membrane having a high softening temperature and a polymer electrolyte having a large oxygen solubility or oxygen permeability, it is preferable to introduce many ring structures into the polymer electrolyte and it is preferable to select a comonomer having a ring structure or a comonomer having cyclopolymerizability. Specific examples of the comonomer having a ring structure include perfluoro(2,2-dimethyl-1,3-dioxole), perfluoro (1,3-dioxole), perfluoro(2-methylene-4-methyl-1,3-dioxolane) and perfluoro(4-methoxy-1,3-dioxole). Specific examples of the comonomer having cyclopolymerizability include perfluoro(3-butenyl vinyl ether), perfluoro(allyl vinyl ether) and perfluoro(3,5-dioxa-1,6-heptadiene).

There are no particular restrictions on the polymerization reaction as long as it is carried out under such a condition that radicals can be generated. For example, it may be carried out by bulk polymerization, solution polymerization, suspension polymerization, emulsion polymerization, polymerization in liquid or in supercritical carbon dioxide, and so on.

There are no particular restrictions on a method of generating radicals, and examples of the method include a method of irradiating such radiation as ultraviolet rays, γ-rays or electron rays, and a method of using a radical initiator applicable to normal radical polymerization. There are no particular restrictions on the reaction temperature of the polymerization reaction, and it is normally carried out, for example, in a temperature range of from 15 to 150° C. In a case using a radical initiator, the radical initiator can be one, for example, selected from bis(fluoroacyl) peroxides, bis(chlorofluoroacyl) peroxides, dialkyl peroxydicarbonates, diacyl peroxides, peroxyesters, azo compounds, persulfates, and so on.

In a case where solution polymerization is carried out, a solvent to be used is preferably one normally having a boiling point of from 20 to 350° C., more preferably from 40 to 150° C. from the viewpoint of handlability. A predetermined amount of a kind or at least two kinds of the above-mentioned fluoromonomers is put into the solvent, and a radical initiator and so forth are added thereinto, thereby generating radicals to effect polymerization. In a case of a gaseous monomer, it may be added all at once, or stepwise, or continuously.

Specific examples of the solvent applicable herein include the following solvents of (i) to (ix). (i) Polyfluorotrialkylamine compounds such as perfluorotributylamine and perfluorotripropylamine.

(ii) Fluoroalkanes such as perfluorohexane, perfluorooctane, perfluorodecane, perfluorododecane, perfluoro(2,7-dimethyloctane), 2H,3H-perfluoropentane, 1H-perfluorohexane, 1H-perfluorooctane, 1H-perfluorodecane, 1H,4H-perfluorobutane, 1H,1H,1H,2H,2H-perfluorohexane, 1H,1H, 1H,2H,2H-perfluorooctane, 1H,1H,1H,2H,2H-perfluorodecane, 3H,4H-perfluoro(2-methylpentane) and 2H,3H-perfluoro(2-methylpentane).

(iii) Chlorofluoroalkanes such as 3,3-dichloro-1,1,1,2,2-pentafluoropropane, 1,3-dichloro-1,1,2,2,3-pentafluoropropane and 1,1-dichloro-1-fluoroethane.

(iv) Fluoroolefins having no double bond at an end of the molecular chain, such as a dimer of hexafluoropropene and a trimer of hexafluoropropene.

(v) Polyfluorocycloalkanes such as perfluorodecalin, perfluorocyclohexane, perfluoro(1,2-dimethylcyclohexane), perfluoro(1,3-dimethylcyclohexane), perfluoro(1,3,5-trimethylcyclohexane) and perfluorodimethylcyclobutane (regardless of structural isomers).

(vi) Polyfluoro-cyclic ether compounds such as perfluoro (2-butyltetrahydrofuran).

(vii) Hydrofluoroethers such as n-$C_3F_7OCH_3$, n-$C_3F_7OCH_2CF_3$, n-$C_3F_7OCHFCF_3$, n-$C_3F_7OC_2H_5$, n-$C_4F_9OCH_3$, iso-$C_4F_9OCH_3$, n-$C_4F_9OC_2H_5$, iso-$C_4F_9OC_2H_5$, n-$C_4F_9OCH_2CF_3$, n-$C_5F_{11}OCH_3$, n-$C_6F_{13}OCH_3$, n-$C_5F_{11}OC_2H_5$, $CF_3OCF(CF_3)CF_2OCH_3$. $CF_3OCHFCH_2OCH_3$, $CF_3OCHFCH_2OC_2H_5$ and n-$C_3F_7OCF_2CF(CF_3)OCHFCF_3$.

(viii) Fluorine-containing low-molecular-weight polyethers.

(ix) tert-butanol, and so on.

These solvents may be used singly or in combination as a mixture of two or more of them.

Other examples of the solvent to be used in carrying out the solution polymerization include chlorofluorocarbons such as 1,1,2-trichloro-1,2,2-trifuloroethane, 1,1,1-trichloro-2,2,2-trifluoroethane, 1,1,1,3-tetrachloro-2,2,3,3-tetrafluoropropane and 1,1,3,4-tetrachloro-1,2,2,3,4,4-hexafluorobutane. However, these chlorofluorocarbons can be technically used, but it is not preferable to use these compounds in view of influence on the global environment.

Suspension polymerization can be carried out by adding monomers to be polymerized, into water as a dispersion medium with use of a nonionic initiator as a radical initiator, such as bis(fluoroacyl) peroxides, bis(chlorofluoroacyl) peroxides, dialkyl peroxydicarbonates, diacyl peroxides, peroxyesters and azo compounds. The solvents described in the section of solution polymerization can also be added as an auxiliary agent. Furthermore, in order to prevent suspended particles from coagulating, a surfactant may be optionally added as a dispersion stabilizer.

In the present invention, the alicyclic fluoromonomer having the present ionic group and the carbon-carbon double bond with radical polymerization reactivity in which at least one of carbon atoms forming the double bond constitutes a ring structure, has high homopolymerization reactivity. The compound (3) is particularly preferred because it has such homopolymerization reactivity higher than that of the perfluorovinyl ether monomer, as to achieve a large molecular weight. Two monomers are compared as follows in terms of homopolymerization reactivity: if each monomer is polymerized under the same polymerization conditions and if one monomer gives a polymer yield and a polymerization degree both larger than those of the other monomer, it is judged that the monomer with the larger polymer yield and polymerization degree has the homopolymerization reactivity higher than the other monomer. The "same polymerization conditions" here means that an identical radical initiator is added to monomers in such an amount that it contained in the same concentration based on the mass ratio, and, after deaeration, polymerization is carried out at the same temperature for the same period of time. For example, it is evaluated by a method described in Examples of the present specification.

A polymer containing a repeating unit (1) is obtained by carrying out polymerization with use of the compound (3), followed by hydrolysis and conversion into an acid form. Such a polymer is suitable for a polymer electrolyte material. In the formula (1), $M^+$ is $H^+$, a monovalent metal cation or an ammonium ion at least one hydrogen atom of which may be substituted by a hydrocarbon group, $R^f$ is a linear or branched perfluoroalkyl group which may contain an oxygen atom of an ether bond type, X is an oxygen atom, a nitrogen atom or a carbon atom, a=0 in the case of X being an oxygen atom, a=1 in the case of X being a nitrogen atom, and a=2 in the case of X being a carbon atom. Furthermore, $R^1$ to $R^6$ are synonymous with $R^1$ to $R^6$ in the compound (3).

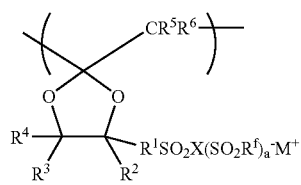

(1)

A preferred one among the polymers containing the repeating unit (1) is a polymer containing a repeating unit in which each of $R^5$ and $R^6$ is a fluorine atom in the formula (1). The reason is that, where each of $R^5$ and $R^6$ is a fluorine atom, the polymer can be synthesized from a monomer having high polymerization reactivity and will have a high molecular weight. Furthermore, a polymer containing a repeating unit (2) is particularly preferable for the same reason.

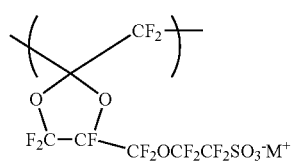

(2)

The polymer being the polymer electrolyte material according to the present invention has a softening temperature of preferably at least 90° C., more preferably at least 100° C. The softening temperature of the polymer here means a temperature at which the elastic modulus thereof starts to decrease abruptly in a test for evaluating the dynamic viscoelasticity of the polymer in which the temperature of the polymer is gradually raised from near room temperature while measuring the elastic modulus. Thus, the softening temperature in the present invention is different from the glass transition temperature normally determined from a value of tanδ and it is generally observed in a temperature region lower than the glass transition temperature.

The softening temperature is measured with a dynamic mechanical analyzer (DMA) and it can also be measured with a thermomechanical analyzer (TMA) by a penetration method using a quartz probe having a diameter of 1 mm. Namely, a solution of a polymer electrolyte material to be measured is prepared; a polymer film is cast from the solution; the quartz probe is brought into contact with this film from a direction of a normal to a surface of this film; the temperature is raised at a rate of from 1 to 10° C./min; and with increase of temperature, the softening temperature is measured as a temperature at which the thickness of the film starts to abruptly decrease by the penetration of the probe into the film. The inventor of the present invention preliminarily confirmed that the value of the softening temperature obtained by this method agreed with the temperature at which the abrupt decrease in modulus started to be observed in a temperature dependency profile of the forementioned elastic modulus of the polymer.

Furthermore, in a case where the load of the probe exerted on the film is too small, the thermal expansion of the film will be observed, but by optimizing the load, it is feasible to measure a degree of penetration of the probe at the softening temperature of the film, without any problem. The film to be used may be a film produced by melt extrusion or hot press of a precursor polymer, followed by hydrolysis or by a treatment for conversion into an acid form after hydrolysis.

An operation temperature of a polymer electrolyte fuel cell is generally at most 80° C., but it is desired to be at least 90° C. and further at least 100° C. If the operation temperature of the fuel cell becomes at least 100° C., it will become feasible to utilize the exhaust heat of the cell more effectively, and at the same time, it will become easier to control the temperature of the cell during the operation because heat removal of the cell becomes easy. Furthermore, in this case, it will become possible to reduce the catalyst poisoning due to carbon monoxide and others contained in an anode reaction gas, and as a result, it will become possible to improve the cell life and to increase the output power of the cell.

Accordingly, the softening temperature of the polymer electrolyte material contained in a catalyst layer and the electrolyte material forming an electrolyte membrane is at least 90° C., preferably at least 100° C., whereby the durability of the polymer electrolyte material is improved, so that it becomes possible to suppress change with time of properties such as swelling and deformation of the polymer electrolyte material during the operation of the cell. As a result, the life of the cell can be improved. In particular, if the polymer electrolyte material of the present invention having the softening temperature of at least 100° C. is used for a catalyst layer of a cathode at which water is formed by reaction of the cell, the improvement in the durability is effectively enhanced, which is preferable. Furthermore, an output voltage of the cell can be increased. It is conceivably because the polymer electrolyte material of the present invention contains a ring structure and it enhances oxygen solubility and permeability.

Furthermore, where a cross-linking structure is introduced into the polymer to be used as the polymer electrolyte material, excessive swelling is suppressed by cross-linkage, so as to prevent decrease of strength. Therefore, the polymer is able to endure operation at a higher temperature than before even though the softening temperature is not necessarily high. If the cross-linking structure is introduced into a polymer having a high softening temperature, the durability is further effectively enhanced. Since the cross-linked polymer can maintain its shape even at temperatures higher than the softening temperature, a membrane with high reliability can be preferably obtained, particularly, in production of a polymer electrolyte membrane.

Furthermore, the polymer electrolyte material of the present invention can be used as a solid acid catalyst. In this case, as the softening temperature is high, the reaction temperature can be made higher, whereby a desired reaction can proceed in a higher temperature region.

The polymer electrolyte material of the present invention preferably has an ion-exchange capacity (hereinafter referred to as "$A_R$") of from 0.5 to 2.5 milliequivalent/g dry resin (hereinafter represented by "meq/g"). If $A_R$ of the polymer electrolyte material is less than 0.5 meq/g, the polymer electrolyte material will tend to decrease its water content to decrease its ionic conductivity. Therefore, if such a polymer electrolyte material is used as a constitutive material for the polymer electrolyte membrane or the catalyst layer of the polymer electrolyte fuel cell, it will tend to be difficult to obtain an adequate cell output. On the other hand, if $A_R$ of the polymer electrolyte material exceeds 2.5 meq/g, the density of ion exchange groups will increase in the polymer electrolyte material, whereby the strength of the polymer electrolyte material will be likely to drop. Furthermore, if such a material is used as a constitutive material for a catalyst layer of a polymer electrolyte fuel cell, the water content will tend to be too high, so as to degrade the gas diffusion or water drainage in the catalyst layer, which can result in easy occurrence of flooding and to cause great change in dimensions due to swelling.

From the same viewpoint as above, $A_R$ of the polymer electrolyte material of the present invention is more preferably from 0.7 to 2.0 meq/g, further preferably from 0.9 to 1.5 meq/g. However, as described below, the polymer electrolyte material of the present invention may have the cross-linking structure. In this case, the preferable lower limit of $A_R$ is the same as above, but the preferable upper limit of $A_R$ differs depending on a molecular weight of a monomer to be used, a molecular weight of a monomer for cross-linkage as described below and a cross-linking density, because the water content is reduced by introduction of cross-linkage. Therefore, the $A_R$ value can be higher with cross-linkage than without cross-linkage.

Furthermore, there are no particular restrictions on the number-average molecular weight of the polymer electrolyte material of the present invention, and it can be adequately set by changing the polymerization degree of the copolymer depending on the purpose. In a case where the material is used for a constituting material for a catalyst layer of the polymer electrolyte fuel cell as in the present embodiment, the number-average molecular weight is preferably from 5,000 to 5,000,000, more preferably from 10,000 to 3,000,000. If the number-average molecular weight of the polymer electrolyte material is less than 5,000, the physical properties such as the swelling degree will tend to change with time, so as to possibly lead to inadequate durability. On the other hand, if the number-average molecular weight exceeds 5,000,000, preparation of a solution can be difficult.

Moreover, if a non-cross-linked polymer electrolyte material is used as a membrane, the number-average molecular weight is preferably from 10,000 to 10,000,000, particularly preferably from 50,000 to 5,000,000, and further preferably from 100,000 to 3,000,000. This is because a too low molecular weight tends to result in inadequate strength as the membrane, while a too high molecular weight tends to make film formation difficult.

The electrolyte material of the present invention may be cross-linked. A cross-linked electrolyte material can be obtained by copolymerizing an alicyclic fluoromonomer having the present ionic group or a group convertible into the present ionic group (e.g., an —SO$_2$F group) and having a carbon-carbon double bond with radical polymerization reactivity wherein either of the carbon atoms at both ends of the double bond constitutes a ring structure, with a fluoromonomer having at least two double bonds with radical polymerizability in the molecule, in the presence of a radical initiating source. The above-mentioned fluoromonomer having at least two double bonds with radical polymerizability is particularly preferably a perfluorinated monomer, and among others, it is particularly preferably a monomer represented by a formula below (where $Q^{F1}$ represents a single bond, an oxygen atom or a perfluoroalkylene group of from 1 to 10 carbons which may have an etheric oxygen atom), or a perfluorodivinyl ether represented by CF$_2$=CFOR$^{f3}$OCF=CF$_2$ (where R$^{f3}$ represents a perfluoroalkylene group of a linear or branched structure which may have an oxygen atom of an ether bond type).

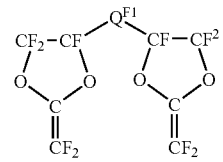

Specific examples of the former monomer include monomers below.

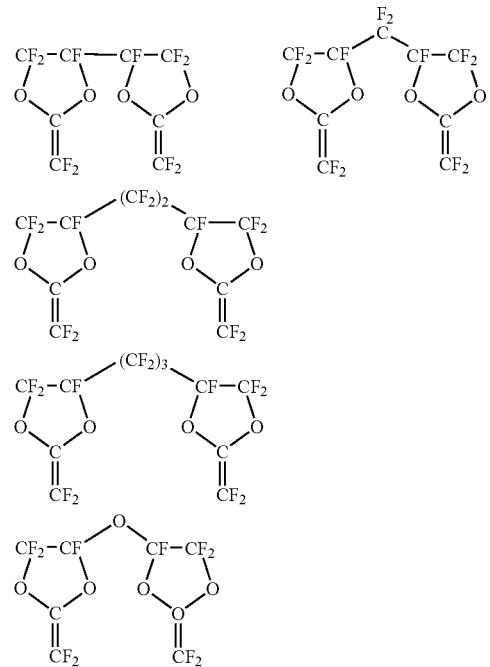

-continued

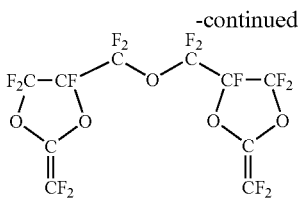

Specific examples of the latter monomer include monomers below. In the formulae, h and k represent integers of from 2 to 8, and i and j each independently represent an integer of from 0 to 5 and i+j≧1.

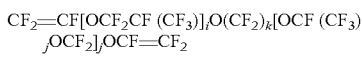

Furthermore, the comonomer as described above may be added to be copolymerized to obtain a polymer having a cross-linking structure. In this case, an appropriate $A_R$ value is that as described above. The molecular weight of the polymer becomes too large to specify because a three-dimensional network structure is formed.

For synthesis of the cross-linked electrolyte material, a monomer to be used is preferably one in a state of liquid under the normal pressure and at the temperature of polymerization because of good handlability. It is preferable to form the cross-linked electrolyte membrane in a film shape at the same time as polymerization.

The electrolyte material of the present invention is not limited to a homopolymer and a random copolymer, and it may be a graft copolymer or a block copolymer. In a case of a graft copolymer, it can be obtained as follows: such radiation as γ rays or an electron beam is irradiated onto a substrate of polyethylene, a tetrafluoroethylene-ethylene copolymer (ETFE), polytetrafluoroethylene (PTFE), a tetrafluoroethylene-hexafluoropropene copolymer (FEP), a tetrafluoroethylene-perfluoro(alkyl vinyl ether) copolymer (PFA) or the like to generate radicals; the radicals are brought into contact with at least one alicyclic fluoromonomer having the present ionic group or the group convertible into the present ionic group and having a carbon-carbon double bond with radical polymerization reactivity, in which either of the carbon atoms at both ends of the double bond constitutes a ring structure, to carry out polymerization. On the graft polymerization, the above-mentioned comonomer may be added and copolymerized. Furthermore, the polymer may be cross-linked by copolymerization with a monomer having a plurality of unsaturated bonds with radical polymerization reactivity in the molecule.

A block copolymer can be obtained, for example, by polymerizing at least one above-mentioned alicyclic fluoromonomer in the presence of a radical initiating source and an iodine compound such as $F(CF_2)_4I$ or $I(CF_2)_4I$, and then polymerizing another monomer therewith. The other monomer may be the above-mentioned comonomer having no functional group. The order of the polymerization steps may be inverted. The polymerization of each segment may be either homopolymerization or copolymerization. The polymerization of the monomer having the ionic group or a group convertible into the ionic group and a ring structure, which is to be used in the present invention, may be copolymerized with another comonomer not having these groups.

The present ionic group in the polymer electrolyte material of the present invention is represented by $-(SO_2X(SO_2R^f)_a)^-M^+$, and from the definitions of X and a, it is specifically preferably an $-SO_3^-M^+$ group such as a sulfonic acid group, a sulfonimide group ($-SO_2N^-M^+SO_2R^f$) or a sulfonmethide group ($-SO_2C^-M^+(SO_2R^f)_2$). Here, $M^+$ is $H^+$, a monovalent metal cation or an ammonium ion at least one hydrogen atom of which may be substituted by a hydrocarbon group; $R^f$ is a linear or branched perfluoroalkyl group which may contain an oxygen atom of an ether bond type; in the case of the sulfonmethide group, two $R^f$s may be identical to or different from each other. $R^f$ here is a linear or branched perfluoroalkyl group which may contain an oxygen atom of an ether bond type, and the carbon number thereof is preferably from 1 to 8, particularly preferably from 1 to 6. It is specifically preferably a perfluoromethyl group, a perfluoroethyl group, or the like.

It is relatively easy to make the polymer electrolyte material of the present invention contain a sulfonimide group. A monomer containing the sulfonimide group can be synthesized by adding chlorine to the unsaturated bond of the compound (3) and by converting the $-SO_2F$ group into a sulfonimide group, followed by dechlorination. Accordingly, polymerization may be carried out by using this monomer.

The $-SO_2F$ group can be converted into a sulfonimide group by reaction with $R^fSO_2NHM^a$ ($M^a$ is an alkali metal or one of primary to quaternary ammoniums), by reaction with $R^fSO_2NH_2$ in the presence of an alkali hydroxide, an alkali carbonate, $M^aF$ ($M^a$ is the same as above), ammonia or one of primary to tertiary amines, or by reaction with $R^fSO_2NM^aSi(CH_3)_3$ ($M^a$ is the same as above). The sulfonimide group is obtained in the form of a salt derived from the base used, in these reactions. A reaction example using the compound (4) is as follows.

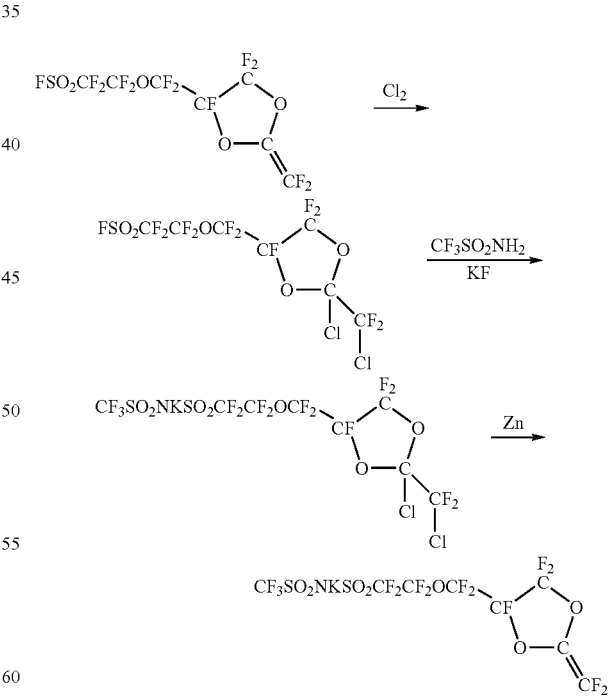

The sulfonimide group of the salt form can be converted into an acid form by treatment with an acid such as sulfuric acid, nitric acid or hydrochloric acid.

This reaction is applicable to a chlorine-addition product of the compound (4) as described above, but a polymer having a sulfonimide group can also be obtained by polymerizing the compound (4) to form a polymer having a fluorosulfonyl group (—$SO_2F$ group) and effecting the same treatment on the —$SO_2F$ group of this polymer.

Moreover, according to the present invention, a polymer having a sulfonate group or a sulfonic acid group can be produced by hydrolyzing the copolymer having an —$SO_2F$ group in the presence of a base or by effecting a conversion treatment into an acid form after hydrolysis.

Furthermore, in order to improve the durability or the like, the polymer constituting the polymer electrolyte material according to the present invention may be fluorinated with fluorine gas or heat-treated in the presence of air and/or water after the polymerization, thereby stabilizing an unstable moiety such as a polymer end.

In the above-mentioned hydrolysis, it is preferable to use an alkali metal hydroxide or an alkali metal carbonate. In the acid treatment, it is preferable to use hydrochloric acid, nitric acid or sulfuric acid. This can convert the fluorosulfonyl group into a sulfonate group (—$SO_3 M^b$ group: $M^b$ represents a counter ion) thereby. Mb is preferably an alkali metal ion or $N^+R^{15}R^{16}R^{17}R^{18}$ ($R^{15}$ to $R^{18}$ each independently represent a hydrogen atom or an alkyl group having from 1 to 5 carbons). The alkali metal ion is preferably a sodium ion, a potassium ion or a lithium ion. Furthermore, $N^+R^{15}R^{16}R^{17}R^{18}$ is preferably $N^+(CH_3)_4$, $N+(CH_2CH_3)_4$, $N^+(CH_2CH_2CH_3)_4$ or $N^+(CH_2CH_2CH_2CH_3)_4$.

The polymer wherein $M^b$ in the sulfonate group is an alkali metal ion, is preferably obtained by reacting an alkali metal hydroxide with a polymer containing a fluorosulfonyl group. The polymer wherein $M^b$ in the sulfonate group is $N^+R^{15}R^{16}R^{17}R^{18}$ is preferably obtained by reacting $N^+R^{15}R^{16}R^{17}R^8(OH)^-$ with the polymer containing a sulfonic acid group, though it can also be obtained by reacting $N^+R^{15}R^{16}R^{17}R^{18}(OH)^-$ with the polymer containing a fluorosulfonyl group.

Furthermore, the polymer containing the sulfonate group is immersed in an aqueous solution containing an ion different from $M^b$ and capable of becoming a counter ion, thereby enabling conversion into the above-mentioned counter ion.

Furthermore, the sulfonate group (—$SO_3 M^b$ group) can be converted into a sulfonic acid group (—$SO_3H$ group) by treatment with an acid such as hydrochloric acid, nitric acid or sulfuric acid. A polymer containing the ionic group obtained in this manner may be treated with a hydrogen peroxide solution if necessary.

These group conversion methods and polymer treatment can be carried out in accordance with the known methods and conditions.

The polymer electrolyte material of the present invention can be formed into a film and used as a polymer electrolyte membrane. There are no particular restrictions on the method of forming into a film, and a cast film may be made from a liquid obtained by dissolving or dispersing the polymer electrolyte material in a solvent. A film may also be obtained through an operation such as extrusion molding or drawing. For the extrusion molding, a polymer with an —$SO_2F$ group which is a precursor of the polymer electrolyte material is used from the viewpoint of excellent melt flowability, and it is preferably converted into a polymer electrolyte membrane by hydrolysis after molding.

Furthermore, the polymer electrolyte membrane may be reinforced with a porous material, fiber, woven fabric, non-woven fabric, or the like of polytetrafluoroethylene (PTFE), a tetrafluoroethylene-hexafluoropropylene copolymer (FEP), a tetrafluoroethylene-perfluoro(alkoxy vinyl ether) copolymer (PFA), polyethylene, polypropylene or the like.

If the electrolyte membrane is made of a cross-linked polymer, it can be, for example, produced as follows. First, at least one alicyclic fluoromonomer having the present ionic group or its precursor group, is mixed with at least one fluoromonomer having at least two double bonds with radical polymerizability in its molecule, and if necessary, with the above-mentioned comonomer and a polymerization initiator is added to the mixture to prepare a liquid composition. Then, the liquid composition is heated for a short period of time according to need, to appropriately increase the viscosity. This liquid composition is applied onto a substrate to make a liquid film, and the film is then heated to effect polymerization to form a film. In applying the composition to form the film, it can be combined with one of the above-mentioned reinforcing materials.

The polymer electrolyte material of the present invention can be well dissolved or dispersed in an organic solvent having a hydroxyl group. There are no particular restrictions on the organic solvent having a hydroxyl group and it is preferably an organic solvent having an alcoholic hydroxyl group.

Specific examples of the organic solvent having an alcoholic hydroxyl group include methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol, and 3,3,4,4,5,5,6,6,7,7,8,8,8-tridecafluoro-1-octanol. In addition, an organic solvent having a carboxyl group such as acetic acid can also be used as an organic solvent other than the alcohols.

The above-mentioned solvents may be used singly or in combination as a mixture of two or more of them, as the organic solvent having a hydroxyl group. Furthermore, they may be used as mixed with water or with other fluorine-containing solvents or the like. Such other fluorine-containing solvents may be the fluorine-containing solvents exemplified as the preferred fluorine-containing solvents in the solution polymerization reaction for producing the polymer electrolyte material as described above. In a case where the organic solvent having a hydroxyl group is used as a mixed solvent with water or with another fluorine-containing solvent, the content of the organic solvent having a hydroxyl group is preferably at least 10%, more preferably at least 20%, based on the total mass of the solvent.

In this case, the polymer electrolyte material may be dissolved or dispersed in the mixed solvent from the beginning, or the mixture may be made in such a manner that the polymer electrolyte material is first dissolved or dispersed in the organic solvent having a hydroxyl group and that water or another fluorine-containing solvent is then mixed thereinto. Furthermore, the dissolution or dispersion of the polymer electrolyte material in the solvent is preferably carried out in a temperature range of from 0 to 250° C., more preferably in a range of from 20 to 150° C., under atmospheric pressure or under a condition of seal-off pressure by means of an autoclave or the like. In a case containing an organic solvent having a boiling point lower than that of water, water is added after or while distilling off the solvent, thereby substituting the solvent with water.

The liquid composition of the present invention obtained using such a solvent is useful for production of a cast film made of the polymer electrolyte material or for production of the catalyst layer of the polymer electrolyte fuel cell. In a case of producing the catalyst layer, a catalyst is mixed into the liquid composition and the resultant liquid is applied to form a coating layer. The content of the polymer electrolyte material in the liquid composition used for such a purpose is preferably from 1 to 50%, more preferably from 3 to 30%, based on the total mass of the liquid composition. If the content of the polymer electrolyte material is less than 1%, the number of coating steps will have to be increased to produce a film or a catalyst layer in a desired thickness, and it will take a long period of time for removing the solvent, to degrade the efficiency of the production operation. On the other hand, if the content of the polymer electrolyte material exceeds 50%, the viscosity of the liquid composition will tend to be too high, so as to degrade handlability.

Furthermore, the liquid composition may contain a resin of another polymer electrolyte material, in addition to the polymer electrolyte material of the present invention. In this case, the content of the polymer electrolyte material of the present invention in the liquid composition is preferably at least 20%, more preferably at least 50%, based on the total mass of the entire polymer electrolyte material in the liquid composition, from the viewpoint of securing sufficient gas diffusibility and water repellency of the catalyst layer obtained using the liquid composition as the raw material.

When the polymer electrolyte material of the present invention is applied to a membrane or a catalyst layer as a material for the polymer electrolyte fuel cell, the ionic group is normally used in a state of a strong acid group, i.e., in a state in which the counter ion of the ionic group is $H^+$.

Concerning a case where the polymer electrolyte material of the present invention is used as an electrolyte for a catalyst layer of an anode or a cathode in a polymer electrolyte fuel cell, description will be given as to an example of preparation of the catalyst layer and an example of preparation of a membrane electrode assembly having this catalyst layer. For example, the catalyst layer can be prepared with use of a coating liquid for formation of the catalyst layer which is prepared by dissolving or dispersing the polymer electrolyte material of the present invention having an $-SO_3H$ group, in a solvent having a hydroxyl group in its molecule to form a liquid composition, and by mixing a catalyst therein. The catalyst is preferably carbon black or the like in a fine particle state having platinum or a platinum alloy supported thereon. The coating liquid is applied in uniform thickness onto a polymer electrolyte membrane, a gas diffusion layer or a support plate prepared separately, and the solvent is removed by drying. Thereafter, the resultant is hot-pressed according to need, thereby preparing the catalyst layer.

The catalyst layer obtained in this way is excellent in gas diffusibility and water repellency, and is particularly suitable for a cathode. The catalyst layer is improved in the gas diffusibility, especially, when the catalyst layer is prepared using a liquid composition containing the polymer electrolyte material wherein the softening temperature of the polymer itself is at least 100° C. A conceivable reason for the improvement is that if the softening temperature of the polymer electrolyte material is at least 100° C., the polymer electrolyte material is unlikely to shrink during gradual vaporization of the solvent from the coating liquid, and pores are formed in adequate size in the interior of the polymer electrolyte material or among agglomerates of catalyst particles coated with the polymer electrolyte material.

The polymer electrolyte material of the present invention may be contained in both catalyst layers of the cathode and the anode, or it may also be contained in either of the catalyst layers while the other catalyst layer is prepared by use of a liquid in which a conventional polymer electrolyte material is dissolved or dispersed in a predetermined solvent.

A membrane electrode assembly for a polymer electrolyte fuel cell can be prepared by disposing each of the catalyst layer for a cathode and the catalyst layer for an anode between a polymer electrolyte membrane and a gas diffusion layer. Where the catalyst layer is formed on the polymer electrolyte membrane, the gas diffusion layer separately prepared may be adjacently disposed or bonded on the catalyst layer, for example. Where the catalyst layer is formed on the gas diffusion layer, the polymer electrolyte membrane separately prepared may be disposed or preferably bonded between the catalyst layer of the cathode and the catalyst layer of the anode. Furthermore, where the catalyst layer is formed on a support plate (support film), it may be transferred, for example, to the polymer electrolyte membrane separately prepared, then the support plate is peeled off, and the gas diffusion layer separately prepared is adjacently disposed on the catalyst layer. The gas diffusion layer herein is made of a conductive porous material such as carbon paper and has a function of supplying a gas uniformly to the catalyst layer and a function as a current collector.

The bonding between the polymer electrolyte membrane and the catalyst layer, and the bonding between the catalyst layer and the gas diffusion layer may be implemented, for example, by hot press or by roll press.

The polymer electrolyte material of the present invention is applicable not only to hydrogen/oxygen type and hydrogen/air type fuel cells, but also to a direct methanol type fuel cells (DMFC). Methanol or an aqueous methanol solution to be used as fuel for DMFC may be supplied by a liquid feed or by a gas feed.

Furthermore, the polymer electrolyte material of the present invention is not limited to use of brine electrolysis and fuel cells, but can be used for various applications. The polymer electrolyte material in the present invention means a polymer material that is used by taking advantage of the functions of an ionic group, and the ionic group possesses an ion conductive function, an ion exchange function, a water-absorbing function, and so on. Where it contains a strong acid group, it has a function as an acid catalyst. It can also be used for a proton permselective membrane to be used for electrolysis of water, production of hydrogen peroxide, production of ozone, recovery of waste acid, and so on; for a diaphragm of a redox flow cell; for a cation exchange membrane for electrodialysis to be used for desalination or salt production; and so on. Furthermore, it may also be used for a polymer electrolyte for a lithium primary cell, a lithium secondary cell, and a lithium ion secondary cell, a solid acid catalyst, a cation exchange resin, a sensor using a modified electrode, an ion exchange filter for removing a slight amount of ions in the air, an actuator, an electrochromic display element, and so on. Namely, it can be used as a material for variety of electrochemical processes.

In addition, the polymer electrolyte material of the present invention is also applicable to membranes for diffusion dialysis to be used for separation and purification of acids, bases and salts, charged porous membranes (a charged reverse osmosis membrane, a charged ultrafiltration membrane, a charged microfiltration membrane, etc.) for separation of protein, dehumidifying membranes, humidifying membranes, and so on.

The polymer electrolyte material of the present invention has a low refractive index because it is made of a fluoropolymer. For this reason, when a thin film is formed by applying a liquid in which the polymer electrolyte material of the present invention with a large ion exchange capacity having the ionic group followed by drying, it can also be used as an antireflection film which can be removed with water or with an alkaline aqueous solution. In this case, water and/or an organic solvent can be used as a solvent for the liquid, and water is preferred. It can also be used as an antireflection film applied onto a resist in a production process of a semiconductor device and the like. Furthermore, it can also be used as an agent for imparting the hydrophilic property to a filter composed of a PTFE porous material.

Now, the present invention will be described in further detail with reference to Examples, but it should be understood that the present invention is by no means restricted to such Examples.

In the following, 1,1,2-trichlorotrifluoroethane will be referred to as R-113, CClF$_2$CF$_2$CHClF as HCFC 225 cb, gas chromatography as GC, size exclusion chromatography as GPC, number-average molecular weight as $M_n$ and weight-average molecular weight as $M_w$.

Perfluorobenzene was used as an internal standard in quantitative determination using $^{19}$F-NMR. A quantitative value by means of GC is a value determined from a peak area ratio. Apparatus name: SEC HLC-8020, manufactured by Tosoh Corporation, was used for GPC; HCFC 225 cb/hexafluoroisopropyl alcohol (at a volume ratio of 99/1) was used as a moving bed; two pieces of Plgel 5µ MIXED-C manufactured by Polymer Laboratories Ltd. were used as columns; and polymethyl methacrylate was used as a standard sample for conversion of molecular weight.

[Synthesis of Compound (4)]

The compound (4) was synthesized through syntheses of the compounds (A1) to (A5) based on the synthesis scheme as shown previously. The compound (A1) was synthesized by a method described in J. Fluorine Chem., 46, 39 (1990).

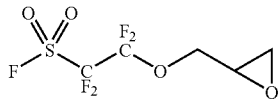
(A1)

CH$_3$C(O)CH$_2$OCOCF$_2$CF$_3$ (A2)

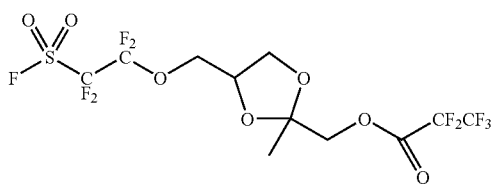
(A3)

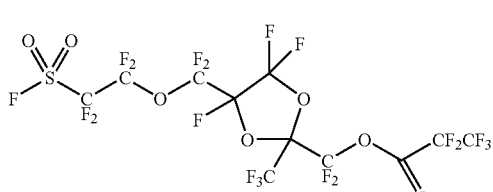
(A4)

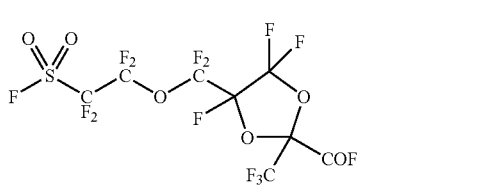
(A5)

<Synthesis of Compound (A2)>

CH$_3$COCH$_2$OH (150.0 g) and triethylamine (225.4 g) were put into a flask and stirred in an ice bath. CF$_3$CF$_2$COF (377.5 g) diluted with nitrogen gas was blown thereinto over 4 hours while the internal temperature was kept at most 10° C. Then the mixture was stirred at room temperature for 2 hours and added into 500 ml of ice water.

A crude liquid obtained was subjected to liquid separation to obtain a fluorocarbon layer. Then the fluorocarbon layer was washed two times with water (250 mL) and dried with magnesium sulfate. It was further filtered to obtain a crude liquid. The filtrate was distilled under reduced pressure to obtain the compound (A2) (167.3 g) as a fraction at 47.1 to 47.9° C./0.7 kPa (absolute pressure). The purity of the fraction by means of GC was 99%.

<Synthesis of Compound (A3)>

Boron trifluoride etherate (32.01 g) and anhydrous acetone (4.5 L) were mixed under a dry atmosphere, and the compound (A1) (1198.1 g) was diluted with anhydrous acetone (1.2 L) and dropwise added into the above mixture. The mixture was refluxed with heating for one hour. After distilling off about a half of acetone, the compound (A2) (1031.41 g) was diluted with toluene (2 L), and added to the reaction system. The rest of acetone was then distilled off under reduced pressure with heating at most 65° C. The reaction mixture was poured into a mixture of a saturated sodium hydrogen carbonate aqueous solution and ice, and extracted with t-butyl methyl ether (2.9 L) in three times. The extract was dried with magnesium sulfate and the drying agent was removed by filtration under reduced pressure, followed by concentration of the filtrate. The residue was purified by means of silica gel column chromatography (developing solvent: HCFC 225 cb/n-hexane 1:1 (volume ratio) first, and then HCFC 225 cb only) to obtain the compound (A3) (1478.95 g). The purity by means of GC was 99%.

<Synthesis of Compound (A4)>

R-113 (312 g) was introduced into a 500 ml nickel autoclave and stirred, and the temperature was maintained at 25° C. A condenser maintained at 20° C., an NaF pellet layer and a condenser maintained at –10° C. were serially arranged at a gas outlet of the autoclave. A liquid returning line was installed to return the condensed liquid from the condenser to the autoclave.

After blowing nitrogen gas for 1.0 hour, fluorine gas diluted with nitrogen gas to 20% (referred to hereinafter as "diluted fluorine gas") was blown thereinto at a flow rate of 12.72 L/h for one hour. While fluorine gas was blown at the same rate, a solution of the compound (A3) (20.0 g) dissolved in R-113 (200 g) was then injected thereinto over 7.6 hours.

Next, while the diluted fluorine gas was blown at the same flow rate and the reactor pressure was kept at 0.15 MPa, 23 mL of an R-113 solution in a benzene concentration of 0.01 g/mL was poured as raising the temperature from 25° C. to 40° C. Then, an inlet for benzene of the autoclave was closed and stirring was continued for 1.0 hour under the pressure of the reactor of 0.15 MPa and the internal temperature of the reactor of 40° C. A total amount of benzene introduced was 0.22 g, and that of R-113 was 23 mL. Then nitrogen gas was blown for 1.0 hour. The product was analyzed by means of $^{19}$F-NMR and it was confirmed that the compound (A4) was produced and the yield was 98%.

<Synthesis of Compound (A5)>

The compound (A4) (10.6 g), together with KF powder (0.18 g) sufficiently dried, was charged into a flask and stirred at room temperature for 24 hours. After cooling, a sample (8.8 g) recovered from the flask was filtered to recover a liquid sample. It was confirmed by NMR and GC-MS that the main product was the compound (A5). The yield was 77.8%.

531 g of a reaction liquid containing the compound (A5) as a main component was obtained from 706 g of the compound (A4) in the same manner as above. 481 g of the compound (A5) in a purity of 99% was obtained by distillation under reduced pressure. The distillation temperature was 71 to 73° C./5.3 kPa.

<Synthesis of Compound (4)>

A stainless steel reaction tube (fluidized bed type) having an inner diameter of ½ inch and filled with glass beads was heated to 350° C., and a gas mixture of the compound (A5) and nitrogen heated (molar ratio 1:9) was passed through. The residence time was 10 seconds and the linear velocity was 2.5 cm/sec. An amount of the compound (A5) used was 68.1 g. The gas coming out from the reaction tube was cooled to obtain a liquid containing the compound (4) as a main component. The reaction yield was 52%.

Then, methanol was added to the reaction liquid and the compound (A5) unreacted was methyl-esterified. The compound (4) was washed with water and then purified by distillation. The boiling point was 48° C./2.7 kPa.

[Synthesis of Polymers]

EXAMPLE 1

A homopolymer of the compound (4) was obtained as follows.

The compound (4) (1.25 g) and perfluorobenzoyl peroxide (4.5 mg) were put into a glass tube, solidified with liquid nitrogen, and sealed in vacuum. The mixture was maintained at 70° C. for 45 hours and a polymer produced was taken out, dissolved in n-$C_6F_{13}H$, reprecipitated with hexane, washed with hexane after filtration, and dried under reduced pressure at 80° C. for 16 hours. The yield of the homopolymer of the compound (4) was 0.823 g (yield 66%). The Mn measured by means of GPC was $6.5 \times 10^4$, and the $M_w$ was $9.8 \times 10^4$. The glass transition temperature measured by DSC was 92° C. The refractive index was 1.35.

Furthermore, the filtrate was concentrated under reduced pressure, then precipitated and washed, and a low boiling component was distilled off under reduced pressure. Then the resultant was dried under reduced pressure at 80° C. for 16 hours, to recover a polymer in the form of powder (0.072 g) composed of a homopolymer of the compound (4). The yield combined with the polymer previously obtained was 71%.

The polymer previously obtained was hydrolyzed in a 10% KOH aqueous solution overnight and it was confirmed that the polymer was dissolved in this aqueous solution.

COMPARATIVE EXAMPLE 1

$CF_2=CFOCF_2CF(CF_3)OCF_2CF_2SO_2F$ (1.25 g) and perfluorobenzoyl peroxide (4.5 mg) were put into a glass tube, solidified with liquid nitrogen and sealed in vacuum. The mixture was reacted at 70° C. for 45 hours and remained as a colorless transparent liquid. The reaction liquid was transferred into a round-bottom flask, and the wall of the glass tube was washed with HCFC 225 cb. The washing liquid was added into the above-mentioned round-bottom flask. A low-boiling component was distilled off under reduced pressure and the mixture was dried under reduced pressure at 80° C. for 16 hours. An oligomer (0.328 g) like starch syrup was obtained. The polymer yield was 26%, the $M_n$ measured by means of GPC was $3.7 \times 10^3$, and the $M_w$ was $4.7 \times 10^3$. This result confirmed that the compound (4) had polymerization reactivity higher than that of $CF_2=CFOCF_2CF(CF_3)OCF_2CF_2SO_2F$.

EXAMPLE 2

The compound (4) and perfluoro(2-methylene-4-methyl-1,3-dioxolane) were copolymerized, followed by hydrolysis and conversion into an acid form, as described below.

7.90 g of the compound (4), 9.60 g of perfluoro(2-methylene-4-methyl-1,3-dioxolane), 109.7 g of HCFC 225 cb and 255 mg of perfluorobenzoyl peroxide were charged into a stainless steel autoclave having a capacity of 0.1 L, and cooled with liquid nitrogen, followed by deaeration. After reaction at 70° C. for 5 hours, the resultant mixture was poured into hexane so as to precipitate a polymer. After washing with hexane, the precipitate was dried in vacuum at 100° C. to obtain 14.0 g of a white polymer.

The ion-exchange capacity $A_R$ of the above-mentioned polymer was determined to be 1.13 meq/g, based on the content of sulfur obtained by the elemental analysis. The intrinsic viscosity at 30° C. measured using perfluoro(2-butyltetrahydrofuran) as a solvent was 0.16 dl/g.

40 g of methanol and 160 g of a 10% KOH aqueous solution were added to 10 g of this polymer and maintained at 60° C. for one week so as to convert the fluorosulfonyl group in the polymer to a —$SO_3K$ group. After filtration, the polymer was immersed in ion exchange water and maintained at 60° C. overnight. The operation of filtration and immersion in water was repeated three times. After filtration, the polymer was immersed in 1 mol/L hydrochloric acid at 60° C. overnight. The operation of filtration and immersion in hydrochloric acid was repeated four times. Then, the same operation of filtration and immersion in water as above was repeated three times. After confirming that the filtrate was neutral, the copolymer was dried under air in an oven at 80° C. overnight, and further dried in vacuum at 80° C. overnight, so as to convert the —$SO_3K$ group into a sulfonic acid group.

90 Parts by mass of ethanol was added to 10 parts by mass of the polymer thus obtained, and the mixture was heated to 60° C., followed by filtration with a PVdF filter having a pore size of 5μ to obtain a colorless transparent ethanol solution in a concentration of 10 mass %.

EXAMPLE 3

The compound (4) and perfluoro(2-methylene-4-methyl-1,3-dioxolane) were copolymerized, followed by hydrolysis and conversion into an acid form, as described below. 4.36 g of the compound (4), 7.31 g of perfluoro(2-methylene-4-methyl-1,3-dioxolane), 72.59 g of HCFC 225 cb and 170 mg of perfluorobenzoyl peroxide were charged into a stainless steel autoclave having a capacity of 0.1 L, and cooled with liquid nitrogen, followed by deaeration. After reaction at 70° C. for 5 hours, polymer coagulation, washing and drying were conducted in the same manner as in Example 2 to obtain 9.35 g of a white polymer.

The ion-exchange capacity $A_R$ of the above-mentioned polymer was determined to be 0.97 meq/g, based on the content of sulfur obtained by the elemental analysis. The intrinsic viscosity at 30° C. measured using perfluoro(2-butyltetrahydrofuran) as a solvent was 0.16 dl/g.

This polymer was hydrolyzed and converted into an acid form in the same manner as in Example 2 to prepare a 10 mass % colorless transparent ethanol solution of the polymer.

A cast film was prepared using the above ethanol solution of the polymer and a softening temperature of the polymer was measured by the penetration method with a 1 mmΦ-quartz probe as described above. First, 10 parts by mass of the above ethanol solution of the copolymer and 2 parts by mass of butanol were mixed and the solution obtained was cast to form a film at room temperature, followed by drying at 160° C. for 30 minutes to obtain a cast film in a thickness of about 200 µm. Then the cast film obtained was set in TMA (manufactured by Mac Science Company). Then a load of 10 g was exerted on the contact part between the cast film and the 1 mmΦ-quartz probe, while the temperature of the cast film was raised at a rate of 5° C./min. A change of the thickness of the cast film was measured. A temperature at which the thickness of the film started to abruptly decrease by the penetration of the probe into the cast film was measured as a softening temperature. The softening temperature of this polymer was 150° C.

EXAMPLE 4

The compound (4) and perfluoro(2-methylene-4-methyl-1,3-dioxolane) were copolymerized, followed by hydrolysis and conversion into an acid form, as described below. 5.44 g of the compound (4), 6.23 g of perfluoro(2-methylene-4-methyl-1,3-dioxolane), 72.65 g of HCFC 225 cb and 170 mg of perfluorobenzoyl peroxide were charged into a stainless steel autoclave having a capacity of 0.1 L and cooled with liquid nitrogen, followed by deaeration. After reaction at 70° C. for 5 hours, polymer coagulation, washing and drying were conducted in the same manner as in Example 2 to obtain 9.11 g of a white polymer.

The ion-exchange capacity $A_R$ of the above-mentioned polymer was determined to be 1.27 meq/g, based on the content of sulfur obtained by the elemental analysis. The intrinsic viscosity at 30° C. measured using perfluoro(2-butyltetrahydrofuran) as a solvent was 0.14 dl/g.

This polymer was hydrolyzed and converted into an acid form in the same manner as in Example 2 to prepare a 10 mass % colorless transparent ethanol solution of the polymer.

A cast film was prepared in the same manner as in Example 3, and the softening temperature thereof was measured and found to be 155° C.

EXAMPLE 5

The compound (4) and perfluoro(2-methylene-4-methyl-1,3-dioxolane) were copolymerized, followed by hydrolysis and conversion into an acid form, as described below. 9.99 g of the compound (4), 11.44 g of perfluoro(2-methylene-4-methyl-1,3-dioxolane), 28.58 g of HCFC 225 cb and 100 mg of perfluorobenzoyl peroxide were charged into a stainless steel autoclave having a capacity of 0.1 L and cooled with liquid nitrogen, followed by deaeration. After reaction at 70° C. for 5 hours, polymer coagulation, washing and drying were conducted in the same manner as in Example 2 to obtain 14.15 g of a white polymer.

The ion-exchange capacity $A_R$ of the above-mentioned polymer was determined to be 1.25 meq/g, based on the content of sulfur obtained by the elemental analysis. The intrinsic viscosity at 30° C. measured using perfluoro(2-butyltetrahydrofuran) as a solvent was 0.46 dl/g.

This polymer was hydrolyzed and converted into an acid form in the same manner as in Example 2 to prepare a 10 mass % colorless transparent ethanol solution of the polymer.

EXAMPLE 6

The compound (4) and perfluoro(2,2-dimethyl-1,3-dioxole) were copolymerized, followed by hydrolysis and conversion into an acid form, as described below.

6.18 g of the compound (4), 14.23 g of perfluoro(2,2-dimethyl-1,3-dioxole), 29.61 g of HCFC 225 cb and 100 mg of perfluorobenzoyl peroxide were charged into a stainless steel autoclave having a capacity of 0.1 L and cooled with liquid nitrogen, followed by deaeration. After reaction at 65° C. for 5 hours, polymer coagulation, washing and drying were conducted in the same manner as in Example 2 to obtain 7.45 g of a white polymer.

The ion-exchange capacity $A_R$ of the above-mentioned polymer was determined to be 1.48 meq/g, based on the content of sulfur obtained by the elemental analysis. The intrinsic viscosity at 30° C. measured using perfluoro(2-butyltetrahydrofuran) as a solvent was 0.23 dl/g.

This polymer was hydrolyzed and converted into an acid form in the same manner as in Example 2 to prepare a 10 mass % colorless transparent ethanol solution of the polymer.

EXAMPLE 7

The compound (4) and tetrafluoroethylene were copolymerized, hydrolyzed and converted into an acid form, as described below.

8.48 g of the compound (4), 76.3 g of HCFC 225 cb containing 17 mg of methanol, and 170 mg of perfluorobenzoyl peroxide were charged into a stainless steel autoclave having a capacity of 0.1 L, and cooled with liquid nitrogen, followed by deaeration. After introducing 11.3 g of tetrafluoroethylene, the reaction was conducted at 70° C. for 50 minutes. The gage pressure was decreased from 0.97 MPa to 0.43 MPa during the reaction. After cooling, the gas inside the system was purged and the resultant mixture was poured into hexane so as to precipitate a polymer. After washing with hexane, the precipitate was dried in vacuum at 100° C. to obtain 14.1 g of a white polymer. The ion exchange capacity $A_R$ of the polymer obtained was determined to be 1.12 meq/g from the content of sulfur obtained by the elemental analysis.

Next, a volumetric flow rate of this polymer was measured. The volumetric flow rate in the present invention means an extruded amount in melt extrusion of a resin under an extruding pressure of 30 kg/cm² with a nozzle having a length of 1 mm and an inner diameter of 1 mm, and the unit thereof is expressed by mm³/sec. The volumetric flow rate of this polymer at 300° C. was measured by means of a flow tester CFT-500A (manufactured by SHIMADZU CORPORATION) and found to be 34 mm³/sec.

This polymer was pressed under pressure at 300° C. to form a film having a thickness of about 100 µm. This film was immersed in a liquid composed of 30% DMSO, 11% KOH and 59% water at 90° C. for 16 hours to convert the fluorosulfonyl group into a —SO$_3$K group. After washing with water, it was immersed in 1 mol/L sulfuric acid and washed with water to convert the —SO$_3$K group into a sulfonic acid group, followed by drying.

A dynamic viscoelasticity was measured for this film with a dynamic mechanical analyzer DVA200 manufactured by ITK Co., Ltd., under the following conditions: a sample width of 0.5 cm, a length between chucks of 2 cm, a measurement frequency of 10 Hz, and a temperature raising rate of 3° C./min. The softening temperature was 104° C., which was obtained from the temperature at which the modulus started to abruptly decrease.

A mechanical strength of the above film was measured at 25° C. and at the relative humidity of 50% and found to be the strength at break of 19.8 MPa and the elongation at break of 116%, which confirmed that it was strong enough as a film. Here the mechanical strength of the film was measured as follows: the film was cut into a sample having a length of 100 mm, a width of 10 mm and a gauge length of 50 mm, and a tensile test of the sample was carried out with an initial distance between chucks of 50 mm, at a tensile rate of 50 mm/min, at 25° C. and at the relative humidity of 50%.

EXAMPLE 8

3 Parts by mass of perfluorobenzoyl peroxide was dissolved in a liquid mixture of 90 parts by mass of the compound (4) and 10 parts by mass of a divinyl ether represented by $CF_2$=$CFOCF_2CF_2CF_2CF_2OCF(CF_3)CF_2OCF$=$CF_2$, and the mixture was heated at 60° C. for a few minutes to prepare a solution A having a slightly high viscosity.

A polyimide film was placed on a glass plate, and a polytetrafluoroethylene porous material (trade name: Fluoropore FP-100, manufactured by NITTO DENKO CORPORATION, with a pore diameter of 1 μm) was placed thereon. The solution A was applied onto the porous material, and a polyimide film was laid thereon and a glass plate was further laid thereon. The polytetrafluoroethylene porous material impregnated with the solution A sandwiched by the glass plates and polyimide films, was heated in an oven at 70° C. for 16 hours and then heated at 90° C. further for 4 hours. The glass plates and the polyimide films were removed to prepare a film in which a cross-linked polymer of the compound (4) was reinforced with the polytetrafluoroethylene porous material.

It was immersed in HCFC 225 cb at 40° C. overnight and dried at 40° C. in vacuum overnight. It was immersed in a liquid composed of 30% DMSO, 11% KOH and 59% water (mass ratio) at 90° C. for 16 hours to convert the fluorosulfonyl group into a —$SO_3K$ group. After washing with water, it was immersed in 1 mol/L sulfuric acid and washed by water to convert the —$SO_3K$ group into a sulfonic acid group, thereby obtaining a film composed of a copolymer having a sulfonic acid group.

COMPARATIVE EXAMPLE 2

A tetrafluoroethylene/$CF_2$=$CFOCF_2CF(CF_3)OCF_2CF_2SO_2F$ copolymer, which has conventionally been used as a material for the catalyst layer of the electrode in the polymer electrolyte fuel cell or as a material for the polymer electrolyte membrane, was prepared by a known method. The ion exchange capacity $A_R$ of the polymer obtained was 1.1 meq/g, which was determined from the content of sulfur obtained by the elemental analysis. In the same manner as in Example 7, the polymer was hydrolyzed and converted into an acid form so as to convert the fluorosulfonyl group into a sulfonic acid group, and the softening temperature of the polymer thus obtained was 79° C.

Then, using the polymer having the fluorosulfonyl group prior to the hydrolysis and conversion into an acid form, a film in a thickness of about 100 μm was prepared by hot press in the same manner as in Example 7, and was hydrolyzed and converted into an acid form in the same manner as in Example 7, to obtain a film composed of a copolymer having a sulfonic acid group.

[Measurement of Water Content]

A cast film was prepared from each of ethanol solutions of the polymers obtained in Examples 2 to 4, and subjected to a heat treatment at 160° C. for 30 minutes. Each of the cast films was immersed in ion exchange water at 90° C. for 16 hours, and respective water contents of the films were measured at room temperature and found to be 62%, 40% and 146%, respectively.

The water content herein was calculated as follows: where the mass of the polymer at room temperature after immersed in ion exchange water at 90° C. was denoted by W1 and where the mass measured after dried at 80° C. for 16 hours after the immersion was denoted by W2, the water content $\Delta W$ % was calculated according to the formula $\Delta W(\%)=(W1-W2)/W2\times 100$.

Films of the polymers with a sulfonic acid group obtained in Example 7 and in Comparative Example 2, were immersed in ion exchange water at 90° C. for 16 hours, and their water contents were obtained in the same manner as above and found to be 70% and 59%, respectively.

Figure 2:
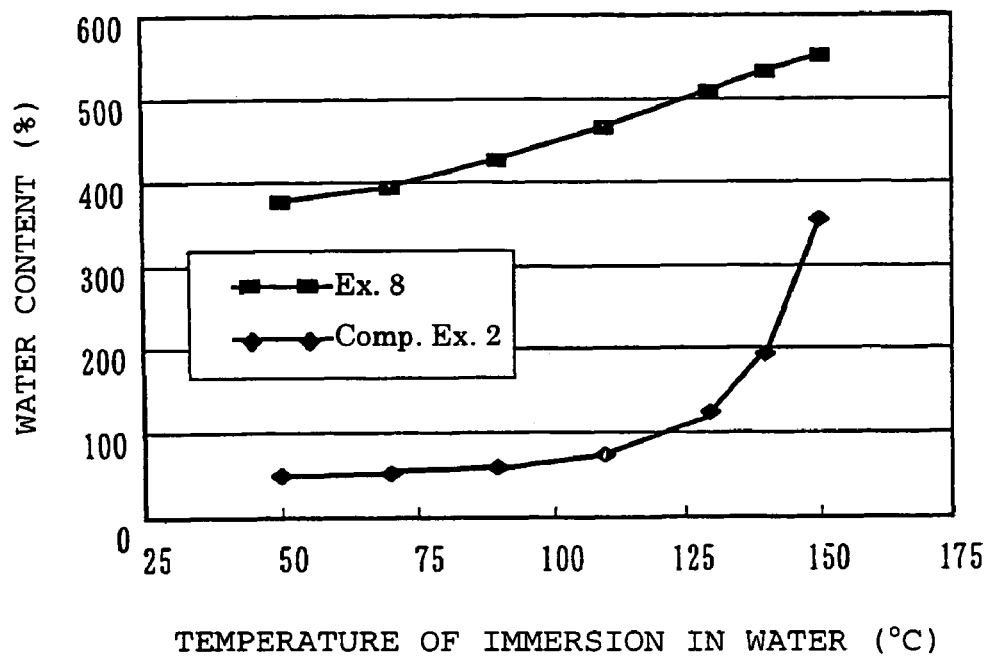
FIG. 2 is a drawing showing relations between water contents and temperatures of immersion in ion-exchange water, of films obtained in Example 8 and Comparative Example 2.

In addition, for each of the films in Example 7 and in Comparative Example 2, a relation between water content and temperature at which the film was immersed in ion exchange water was checked, and FIG. 1 shows the result. Likewise, for the film obtained in Example 8, a relation between water content and temperature at which the film was immersed in ion exchange water was checked in comparison with the film in Comparative Example 2, and FIG. 2 shows the result. For calculation of the water content of Example 8, a difference between the weight of the film and the weight of the porous material was used. It is clear from FIGS. 1 and 2 that the polymer electrolyte materials of the present invention show small temperature dependency of the water content even at high temperatures and are superior in high-temperature characteristics to the conventional polymers.

[Measurement of Oxygen Gas Solubility]

With respect to the films (acid form) in Example 7 and in Comparative Example 2 similar to those used in the measurement of the water content, oxygen gas permeability was evaluated by a high vacuum pressure method (ASTM D1434-75 procedure M). The apparatus used was a gas permeability apparatus manufactured by Rikaseiki Co., Ltd.

Concerning Example 7, the oxygen gas permeability coefficient P was $0.69 \times 10^{-13}$ cm$^3$ (STP)·cm·cm$^{-2}$·s$^{-1}$·Pa$^{-1}$, the oxygen gas diffusion coefficient D was $0.030 \times 10^{-6}$ cm$^2$·s$^{-1}$ and the oxygen gas solubility coefficient S was $2.3 \times 10^{-6}$ cm$^3$(STP)·cm$^{-3}$·Pa$^{-1}$. As for Comparative Example 2 in contrast to it, the oxygen gas permeability coefficient P was $0.4 \times 10^{-13}$ cm$^3$(STP)·cm·cm$^{-2}$·s$^{-1}$·Pa$^{-1}$, the oxygen gas diffusion coefficient D was $0.026 \times 10^{-6}$ cm$^{2.-1}$ and the oxygen gas solubility coefficient S was $1.5 \times 10^{-6}$ cm$^3$(STP)·cm$^{-3}$·Pa$^{-}$.

[Preparation of Polymer Electrolyte Fuel Cell (Example)]

The ethanol solution of the polymer obtained in Example 4 and a supported catalyst having 55 mass % of platinum supported on carbon were mixed with water to obtain a dispersion liquid with a solid content of 12 mass % in which the above polymer and the supported catalyst (at the mass ratio of the polymer to the carbon being 4:5) were dispersed in the mixture dispersion medium of ethanol and water (at the mass ratio of 1:1). This dispersion liquid was used as a coating liquid for forming a cathode catalyst layer. This coating liquid was applied onto a polyethylene terephthalate (PET) film of a thickness of 100 μm a surface of which was treated with a silicone-based mold-releasing agent, by a die coating method and dried at 80° C. to form a cathode catalyst layer in a thickness of about 10 μm and in a supported platinum amount of about 0.5 mg/cm$^2$.

An ethanol solution of a polymer composed of a repeating unit based on $CF_2$=$CF_2$ and a repeating unit based on $CF_2$=$CF$—$OCF_2CF(CF_3)$—$OCF_2CF_2SO_3H$ and having $A_R$ Of 1.1 meq/g, and a supported catalyst having a platinum/ruthenium alloy (at the mass ratio of 5:4) supported on carbon were mixed with water to obtain a dispersion liquid with a solid content of 12 mass % in which the above polymer and the supported catalyst (at the molar ratio of 27:73) were dispersed in the mixture dispersion medium of ethanol and water (at the mass ratio of 1:1). This dispersion solution was used as a coating liquid for forming an anode catalyst layer. This coating liquid was applied onto a PET film by a die coating method in the same manner as in the case of the cathode catalyst layer, to form an anode catalyst layer in a thickness of about 10 μm and with a supported platinum amount of about 0.5 mg/cm².

The above-mentioned cathode catalyst layer was placed on one surface of an ion exchange membrane (ion exchange capacity: 1.1 meq/g) of a thickness of 30 μm composed of a repeating unit based on $CF_2$=$CF_2$ and a repeating unit based on $CF_2$=CF—$OCF_2CF(CF_3)$—$OCF_2CF_2SO_3H$, and the above-mentioned anode catalyst layer was placed on the other surface thereof. Then the cathode catalyst layer and the anode catalyst layer were each transferred onto the respective surfaces of the membrane by a transfer method. Then the PET films were peeled off to obtain a membrane-catalyst layer assembly having an effective electrode area of 25 cm². The transfer was carried out at 130° C. under a pressure of 3 MPa.

Then two pieces of carbon cloth having a thickness of about 300 μm, on a surface of which a conductive layer in a thickness of about 10 μm composed of carbon black and polytetrafluoroethylene particles was formed, were prepared as gas diffusion layers, and laid on both sides of the membrane-catalyst layer assembly to obtain a membrane electrode assembly with gas diffusion layers. This was mounted with a gasket around it between separators having flow paths for supply of reaction gases to obtain a cell for measurement of cell performance. Hydrogen gas was supplied to the anode of this cell and air was supplied to the cathode. Hydrogen and air were humidified as gases having a dew point of 70° C. and supplied at a cell temperature of 70° C., a utilization rate of hydrogen gas of 70% and a utilization rate of air of 40%. Two samples were prepared and a power generation test was conducted therewith. Table 1 shows the result of a relation between current density and cell voltage.

[Production of Polymer Electrolyte Fuel Cell (Comparative Example)]

A cathode catalyst layer was prepared in the same manner as in the above example except that a polymer composed of a repeating unit based on $CF_2$=$CF_2$ and a repeating unit based on $CF_2$=CF—$OCF_2CF(CF_3)$—$OCF_2CF_2SO_3H$ and having $A_R$ of 1.1 meq/g was used instead of the polymer obtained in Example 4. A membrane electrode assembly was prepared in the same manner as in the above example except that this cathode catalyst layer was used. A power generation test was conducted with the assembly. Table 1 shows the result of a relation between current density and cell voltage.

TABLE 1

|  | run | Cell voltage [mV] at 0 A/cm² | Cell voltage [mV] at 0.2 A/cm² |
|---|---|---|---|
| Example | 1 | 965 | 771 |
|  | 2 | 961 | 768 |
| Comparative | 1 | 951 | 752 |
| Example | 2 | 945 | 755 |

INDUSTRIAL APPLICABILITY

The polymer electrolyte material of the present invention has the softening temperature higher than those of the conventional materials and demonstrates the low temperature dependency of the water content at high temperatures. Therefore, when it is applied, for example, to a polymer electrolyte fuel cell, it becomes feasible to operate the fuel cell at a temperature higher than before.

Furthermore, since the polymer electrolyte material of the present invention has the ring structure, it is excellent in oxygen gas permeability. Accordingly, when it is contained, particularly, as an electrolyte in a catalyst layer of a cathode of a polymer electrolyte fuel cell, it is excellent in gas diffusivity. In addition, since one monomer unit in the polymer constituting the polymer electrolyte material has the ring structure and the sulfonic acid group together, the ion exchange capacity of the polymer electrolyte material can be increased, thereby enhancing the electric conductivity. Therefore, the fuel cell using the above-mentioned electrolyte material is able to provide a high output power.

The entire disclosure of Japanese Patent Application No. 2003-123383 filed on Apr. 28, 2003 including specification, claims, drawings and summary is incorporated herein by reference in its entirety.

What is claimed is:

1. A polymer electrolyte material comprising a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by —$(SO_2X(SO_2R^f)_a)^-M^+$ where $M^+$ is $H^+$, a monovalent metal cation or an ammonium ion at least one hydrogen atom of which may be substituted by a hydrocarbon group, $R^f$ is a linear or branched perfluoroalkyl group which may contain an oxygen atom of an ether bond type, X is an oxygen atom, and a=0.

2. The polymer electrolyte material according to claim 1, wherein the polymer is a copolymer containing at least one member selected from the group consisting of a repeating unit based on a nonionic fluoromonomer having a ring structure and radical polymerizability, a repeating unit based on a nonionic fluoromonomer having cyclopolymerizability, and a repeating unit based on tetrafluoroethylene.

3. The polymer electrolyte material according to claim 1, wherein the polymer is a perfluorinated polymer.

4. The polymer electrolyte material according to claim 3, wherein the repeating unit based on the alicyclic fluoromonomer is a repeating unit represented by formula (1) below where $R^1$ is a bivalent perfluoro organic group which may contain an oxygen atom of an ether bond type, and $R^2$ to $R^6$ each independently are a monovalent perfluoro organic group which may contain an oxygen atom of an ether bond type, or a fluorine atom:

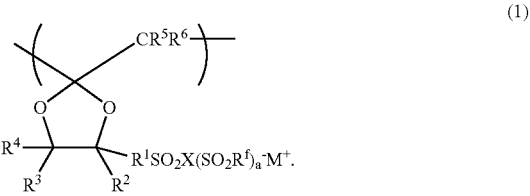

5. The polymer electrolyte material according to claim 4, wherein each of $R^5$ and $R^6$ in the formula (1) is a fluorine atom.

6. The polymer electrolyte material according to claim 1, wherein the ionic group is represented by —$(SO_2X(SO_2R^f)_a)^-H^+$, and has a softening temperature of at least 90° C.

7. The polymer electrolyte material according to claim 5, wherein the repeating unit based on the alicyclic fluoromonomer is represented by formula (2) below:

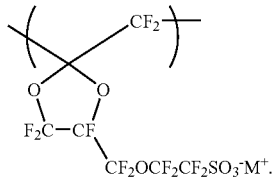

8. A polymer electrolyte material comprising a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by —(SO$_2$X (SO$_2$R$^f$)$_a$)$^-$M$^+$ where M$^+$ is H$^+$, a monovalent metal cation or an ammonium ion at least one hydrogen atom of which may be substituted by a hydrocarbon group, R$^f$ is a linear or branched perfluoroalkyl group which may contain an oxygen atom of an ether bond type, X is a nitrogen atom, and a=1.

9. The polymer electrolyte material according to claim 8, wherein the polymer is a copolymer containing at least one member selected from the group consisting of a repeating unit based on a nonionic fluoromonomer having a ring structure and radical polymerizability, a repeating unit based on a nonionic fluoromonomer having cyclopolymerizability, and a repeating unit based on tetrafluoroethylene.

10. The polymer electrolyte material according to claim 8, wherein the polymer is a perfluorinated polymer.

11. The polymer electrolyte material according to claim 10, wherein the repeating unit based on the alicyclic fluoromonomer is a repeating unit represented by formula (1) below where R$^1$ is a bivalent perfluoro organic group which may contain an oxygen atom of an ether bond type, and R$^2$ to R$^6$ each independently are a monovalent perfluoro organic group which may contain an oxygen atom of an ether bond type, or a fluorine atom:

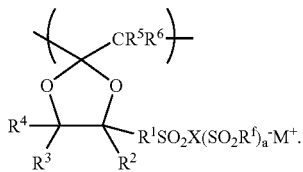

12. The polymer electrolyte material according to claim 11, wherein each of R$^5$ and R$^6$ in the formula (1) is a fluorine atom.

13. The polymer electrolyte material according to claim 8, wherein the ionic group is represented by —(SO$_2$X(SO$_2$R$^f$)$_a$)$^{-H+}$, and has a softening temperature of at least 90° C.

14. A polymer electrolyte material comprising a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by —(SO$_2$X (SO$_2$R$^f$)$_a$)$^-$M$^+$ where M$^+$ is H$^+$, a monovalent metal cation or an ammonium ion at least one hydrogen atom of which may be substituted by a hydrocarbon group, R$^f$ is a linear or branched perfluoroalkyl group which may contain an oxygen atom of an ether bond type, X is a carbon atom, and a=2.

15. The polymer electrolyte material according to claim 14, wherein the polymer is a copolymer containing at least one member selected from the group consisting of a repeating unit based on a nonionic fluoromonomer having a ring structure and radical polymerizability, a repeating unit based on a nonionic fluoromonomer having cyclopolymerizability, and a repeating unit based on tetrafluoroethylene.

16. The polymer electrolyte material according to claim 14, wherein the polymer is a perfluorinated polymer.

17. The polymer electrolyte material according to claim 16, wherein the repeating unit based on the alicyclic fluoromonomer is a repeating unit represented by formula (1) below where R$^1$ is a bivalent perfluoro organic group which may contain an oxygen atom of an ether bond type, and R$^2$ to R$^6$ each independently are a monovalent perfluoro organic group which may contain an oxygen atom of an ether bond type, or a fluorine atom:

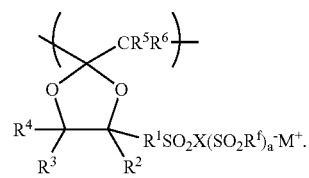

18. The polymer electrolyte material according to claim 17, wherein each of R$^5$ and R$^6$ in the formula (1) is a fluorine atom.

19. The polymer electrolyte material according to claim 14, wherein the ionic group is represented by —(SO$_2$X (SO$_2$R$^f$)$_a$)$^-$H$^+$, and has a softening temperature of at least 90° C.

20. A polymer electrolyte membrane comprising a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by —(SO$_2$X (SO$_2$R$^f$)$_a$)$^-$M$^+$ where M$^+$ is H$^+$, a monovalent metal cation or an ammonium ion at least one hydrogen atom of which may be substituted by a hydrocarbon group, R$^f$ is a linear or branched perfluoroalkyl group which may contain an oxygen atom of an ether bond type, X is an oxygen atom, a nitrogen atom or a carbon atom, a=0 in the case of X being an oxygen atom, a=1 in the case of X being a nitrogen atom, and a=2 in the case of X being a carbon atom.

21. The polymer electrolyte membrane according to claim 20, wherein the polymer is a copolymer containing at least one member selected from the group consisting of a repeating unit based on a nonionic fluoromonomer having a ring structure and radical polymerizability, a repeating unit based on a nonionic fluoromonomer having cyclopolymerizability, and a repeating unit based on tetrafluoroethylene.

22. The polymer electrolyte membrane according to claim 21, wherein the repeating unit based on the alicyclic fluoromonomer is a repeating unit represented by formula (1) below where R$^1$ is a bivalent perfluoro organic group which may contain an oxygen atom of an ether bond type, and R$^2$ to $R^6$ each independently are a monovalent perfluoro organic group which may contain an oxygen atom of an ether bond type, or a fluorine atom

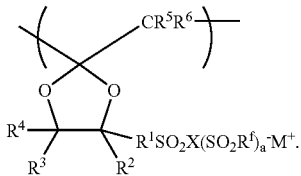

(1)

23. The polymer electrolyte membrane according to claim 20, wherein the ionic group is represented by $-(SO_2X(SO_2R^f)_a)^-H^+$, and has a softening temperature of at least 90° C.

24. The polymer electrolyte membrane according to claim 22, wherein the repeating unit based on the alicyclic fluoromonomer is represented by formula (2) below

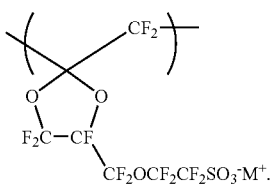

(2)

25. The polymer electrolyte membrane according to claim 20, comprising a repeating unit based on a fluoromonomer having at least two double bonds with radical polymerizability in its molecule, the polymer electrolyte membrane being cross-linked by a said repeating unit.

26. A liquid composition having a polymer electrolyte material dissolved or dispersed in at least one solvent selected from the group consisting of a solvent having a hydroxyl group, and water, wherein the polymer electrolyte material comprises a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by $-(SO_2X(SO_2R^f)_a)^-M^+$ where $M^+$ is $H^+$, a monovalent metal cation or an ammonium ion at least one hydrogen atom of which may be substituted by a hydrocarbon group, $R^f$ is a linear or branched perfluoroalkyl group which may contain an oxygen atom of an ether bond type, X is an oxygen atom, a nitrogen atom or a carbon atom, a=0 in the case of X being an oxygen atom, a=1 in the case of X being a nitrogen atom, and a=2 in the case of X being a carbon atom.

27. The liquid composition according to claim 26, wherein the polymer is a copolymer containing at least one member selected from the group consisting of a repeating unit based on a nonionic fluoromonomer having a ring structure and radical polymerizability, a repeating unit based on a nonionic fluoromonomer having cyclopolymerizability, and a repeating unit based on tetrafluoroethylene.

28. The liquid composition according to claim 27, wherein the repeating unit based on the alicyclic fluoromonomer is a repeating unit represented by formula (1) below where $R^1$ is a bivalent perfluoro organic group which may contain an oxygen atom of an ether bond type, and $R^2$ to $R^6$ each independently are a monovalent perfluoro organic group which may contain an oxygen atom of an ether bond type, or a fluorine atom

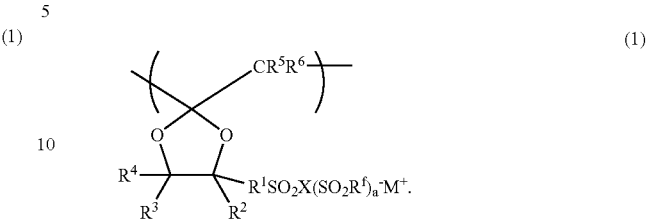

(1)

29. A membrane electrode assembly for a polymer electrolyte fuel cell comprising a cathode and an anode each having a catalyst layer containing a catalyst and a polymer electrolyte, and a polymer electrolyte membrane disposed between the cathode and the anode, wherein the polymer electrolyte membrane is a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by $-(SO_2X(SO_2R^f)_a)^{-M+}$ where $M^+$ is $H^+$, a monovalent metal cation or an ammonium ion at least one hydrogen atom of which may be substituted by a hydrocarbon group, $R^f$ is a linear or branched perfluoroalkyl group which may contain an oxygen atom of an ether bond type, X is an oxygen atom, a nitrogen atom or a carbon atom, a=0 in the case of X being an oxygen atom, a=1 in the case of X being a nitrogen atom, and a=2 in the case of X being a carbon atom.

30. The membrane electrode assembly for a polymer electrolyte fuel cell according to claim 29, wherein the polymer is a copolymer containing at least one member selected from the group consisting of a repeating unit based on a nonionic fluoromonomer having a ring structure and radical polymerizability, a repeating unit based on a nonionic fluoromonomer having cyclopolymerizability, and a repeating unit based on tetrafluoroethylene.

31. The membrane electrode assembly for a polymer electrolyte fuel cell according to claim 30, wherein the repeating unit based on the alicyclic fluoromonomer is a repeating unit represented by formula (1) below where $R^1$ is a bivalent perfluoro organic group which may contain an oxygen atom of an ether bond type, and $R^2$ to $R^6$ each independently are a monovalent perfluoro organic group which may contain an oxygen atom of an ether bond type, or a fluorine atom

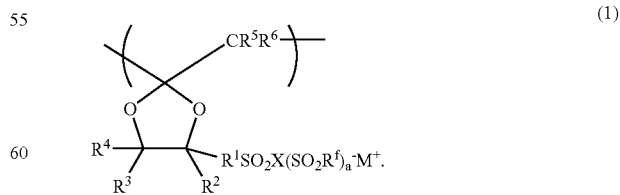

(1)

32. The membrane electrode assembly for a polymer electrolyte fuel cell according to claim 31, wherein the repeating unit based on the alicyclic fluoromonomer is represented by formula (2) below

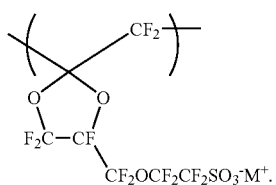

(2)

33. A membrane electrode assembly for a polymer electrolyte fuel cell comprising a cathode and an anode each having a catalyst layer containing a catalyst and a polymer electrolyte, and a polymer electrolyte membrane disposed between the cathode and the anode, wherein at least one of the catalyst layers of the cathode and the anode comprises a polymer having a repeating unit based on an alicyclic fluoromonomer having a carbon-carbon double bond with radical polymerization reactivity, either of carbon atoms at both ends of the double bond constituting a ring structure, wherein the fluoromonomer has an ionic group represented by $-(SO_2X(SO_2R^f)_a)^-M^+$ where $M^+$ is $H^+$, a monovalent metal cation or an ammonium ion at least one hydrogen atom of which may be substituted by a hydrocarbon group, $R^f$ is a linear or branched perfluoroalkyl group which may contain an oxygen atom of an ether bond type, X is an oxygen atom, a nitrogen atom or a carbon atom, a=0 in the case of X being an oxygen atom, a=1 in the case of X being a nitrogen atom, and a=2 in the case of X being a carbon atom.

34. The membrane electrode assembly for a polymer electrolyte fuel cell according to claim 33, wherein the ionic group is represented by $-(SO_2X(SO_2R^f)_a)^-H^+$, and the polymer electrolyte material has a softening temperature of at least 90° C.

* * * * *